(12) United States Patent
Chrabieh et al.

(10) Patent No.: US 8,081,695 B2
(45) Date of Patent: Dec. 20, 2011

(54) CHANNEL ESTIMATION USING FREQUENCY SMOOTHING

(75) Inventors: Rabih Chrabieh, San Diego, CA (US); Samir S. Soliman, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 1010 days.

(21) Appl. No.: 11/853,809

(22) Filed: Sep. 11, 2007

(65) Prior Publication Data

US 2008/0219339 A1  Sep. 11, 2008

Related U.S. Application Data

(63) Continuation-in-part of application No. 11/684,566, filed on Mar. 9, 2007, and a continuation-in-part of application No. 11/755,719, filed on May 30, 2007.

(60) Provisional application No. 60/896,480, filed on Mar. 22, 2007.

(51) Int. Cl.
*H04L 23/02* (2006.01)
*H04L 27/36* (2006.01)
*H04L 27/38* (2006.01)

(52) U.S. Cl. ................. 375/261; 375/295; 375/316

(58) Field of Classification Search ........... 375/222, 375/279, 280, 281, 295, 298, 308, 260–261, 375/300, 316, 320, 324, 340; 370/319, 321, 370/344, 347, 522, 525, 526, 527, 208–210, 370/528; 332/103
See application file for complete search history.

(56) References Cited

U.S. PATENT DOCUMENTS

| | | | |
|---|---|---|---|
| 5,852,630 A | 12/1998 | Langberg et al. | |
| 6,493,396 B1 | 12/2002 | Nguyen et al. | |
| 7,058,368 B2 | 6/2006 | Nicholls et al. | |
| 7,113,559 B2 | 9/2006 | Baas et al. | |
| 7,233,629 B2 | 6/2007 | Auranen | |
| 7,248,625 B2 | 7/2007 | Chien | |
| 7,251,291 B1 | 7/2007 | Dubuc et al. | |
| 7,313,203 B2 | 12/2007 | Tubbax et al. | |

(Continued)

FOREIGN PATENT DOCUMENTS
WO    01031867    5/2001

(Continued)

OTHER PUBLICATIONS

International Search Report, PCT/US2008/056321, International Search Authority, European Patent Office, Apr. 12, 2008.

(Continued)

*Primary Examiner* — Tesfaldet Bocure
*Assistant Examiner* — Lawrence Williams
(74) *Attorney, Agent, or Firm* — Qualcomm Patent Group; James H. Yancey, Jr.

(57) ABSTRACT

A system and method are provided for supplying a frequency-smoothed communications training signal. The method generates a frequency-smoothed unbiased training signal in a quadrature modulation transmitter. The frequency-smoothed unbiased training signal includes a plurality of pilot signal products, where each pilot signal product includes complex plane information represented by a reference frequency subcarrier, multiplying complex plane information represented by mirror frequency subcarrier. The sum of the plurality of pilot signal products is equal to zero. The method supplies the frequency-smoothed unbiased training signal so that it may be transmitted within a single symbol period. System and methods are also provided for using a frequency-smoothed training signal in the calculation of a receiver channel estimate.

58 Claims, 7 Drawing Sheets

U.S. PATENT DOCUMENTS

| | | | |
|---|---|---|---|
| 7,366,255 B1 | 4/2008 | Hwang et al. | |
| 7,385,617 B2 | 6/2008 | Tahat | |
| 7,415,074 B2* | 8/2008 | Seto et al. | 375/260 |
| 7,443,783 B2 | 10/2008 | DeChamps et al. | |
| 7,453,794 B2* | 11/2008 | Fang et al. | 370/210 |
| 7,529,306 B2 | 5/2009 | Brotje et al. | |
| 7,626,921 B2 | 12/2009 | Egashira et al. | |
| 7,697,620 B2* | 4/2010 | Kroeger et al. | 375/260 |
| 2002/0191713 A1 | 12/2002 | McVey | |
| 2003/0072254 A1* | 4/2003 | Ma et al. | 370/208 |
| 2003/0156656 A1 | 8/2003 | Ojard et al. | |
| 2004/0095899 A1 | 5/2004 | Murakami et al. | |
| 2004/0184398 A1 | 9/2004 | Walton et al. | |
| 2004/0264583 A1 | 12/2004 | Ahmed | |
| 2005/0213676 A1 | 9/2005 | Stopler | |
| 2005/0276354 A1 | 12/2005 | Su et al. | |
| 2005/0281239 A1 | 12/2005 | Williams | |
| 2006/0203795 A1 | 9/2006 | Welborn et al. | |
| 2007/0121757 A1 | 5/2007 | Chu et al. | |
| 2007/0223393 A1 | 9/2007 | Urushihara et al. | |
| 2008/0130779 A1 | 6/2008 | Levi et al. | |
| 2008/0219379 A1* | 9/2008 | Chrabieh | 375/298 |
| 2008/0219386 A1* | 9/2008 | Chrabieh et al. | 375/343 |
| 2008/0240289 A1 | 10/2008 | Murakami et al. | |

FOREIGN PATENT DOCUMENTS

| | | |
|---|---|---|
| WO | 03101064 | 12/2003 |
| WO | 2004025918 | 3/2004 |
| WO | 2005094028 | 10/2005 |

OTHER PUBLICATIONS

Written Opinion, PCT/US2008/056321, International Search Authority, European Patent Office, Apr. 12, 2008.

International Search Report, PCT/US2008/056327, International Search Authority, European Patent Office, Apr. 12, 2008.

Written Opinion, PCT/US2008/056327, International Search Authority, European Patent Office, Apr. 12, 2008.

International Search Report, PCT/US2008/056333, International Search Authority, European Patent Office, Nov. 20, 2008.

Written Opinion, PCT/US2008/056333, International Search Authority, European Patent Office, Nov. 20, 2008.

Bagheri et al., "Compensation Schemes and Performance Analysis of IQ Imbalances in OFDM Receivers," IEEE Transactions on Signal Processing, Aug. 1, 2005, pp. 3257-3268, vol. 53, No. 8, IEEE Service Center, New York, NY, US, XP011136506.

Xing et al., "Frequency Offset and I/Q Imbalance Compensation for Direct-Conversion Receivers," IEEE Transactions on Wireless Communications, Mar. 1, 2005, pp. 673-680, vol. 4, No. 2, IEEE Service Center, Piscataway, NJ, US, XP011129220.

Guanbin Xing et al: "Frequency offset and i/q imbalance compensation for OFDM direct-conversion receivers" 2003 IEEE International Conference on Acoustics, Speech, and Signal Processing (ICASSP), vol. 4, 6. pages IV_708-1V_711. XP010641258.

Jan Tubbax et al.: "Compensation of IQ imbalance in OFDM systems," pp. 3403-3407, IEEE publications 2003.

International Search Report—PCT/US2008/056329, International Search Authority—European Patent Office—Jun. 24, 2008.

Written Opinion—PCT/US2008/056329, International Search Report—European Patent Office—Jun. 24, 2008.

Giugno L. et al.: "Low-Complexity Gain and Phase I/Q Mismatch Compensation using Orthogonal Pilot Sequences," EUSIPCO Sep. 2006.

Windisch M. el al.: "Preamble Design for an Efficient I/Q Imbalance Compensation in OFDM Direct-Conversion Receivers," Proc. 10th Int. OFDM Workshop (InOWo'05), Aug. 2005.

\* cited by examiner

CHANNEL ESTIMATION USING FREQUENCY SMOOTHING

CLAIM OF PRIORITY UNDER 35 U.S.C. §119

The present Application for Patent claims priority to Provisional Application No. 60/896,480, filed Mar. 22, 2007, entitled, QUADRATURE IMBALANCE MITIGATION USING UNBIASED TRAINING SIGNALS, status Pending.

CLAIM OF PRIORITY UNDER 35 U.S.C. §120

The present Application for Patent is a continuation-in-part of Patent Application No. U.S. Ser. No. 11/684,566, filed Mar. 9, 2007, entitled, QUADRATURE MODULATION ROTATING TRAINING SEQUENCE, status pending; assigned to the assignee hereof and hereby expressly incorporated by reference herein.

The present Application for Patent is a continuation-in-part of patent application Ser. No. and U.S. Ser. No. 11/755,719, filed May 30, 2007, entitled, QUADRATURE IMBALANCE MITIGATION USING UNBIASED TRAINING SEQUENCES, status pending, assigned to the assignee hereof and hereby expressly incorporated by reference herein.

The present Application for Patent is related to U.S. patent application entitled, QUADRATURE IMBALANCE ESTIMATION USING UNBIASED TRAINING SEQUENCES, U.S. Ser. No. 11/853,808, filed Sep. 11, 2007, and assigned to the assignee, which is hereby incorporated by reference in its entirety.

BACKGROUND

1. Field

This invention relates generally to communication channel estimation and, more particularly, to systems and methods for improving the use of quadrature modulation unbiased training sequences in the training of receiver channel estimates, by removing quadrature imbalance errors.

2. Background

FIG. 1 is a schematic block diagram of a conventional receiver front end (prior art). A conventional wireless communications receiver includes an antenna that converts a radiated signal into a conducted signal. After some initial filtering, the conducted signal is amplified. Given a sufficient power level, the carrier frequency of the signal may be converted by mixing the signal (down-converting) with a local oscillator signal. Since the received signal is quadrature modulated, the signal is demodulated through separate I and Q paths before being combined. After frequency conversion, the analog signal may be converted to a digital signal, using an analog-to-digital converter (ADC), for baseband processing. The processing may include a fast Fourier transform (FFT).

There are a number of errors that can be introduced into the receiver that detrimentally affect channel estimations and the recovery of the intended signal. Errors can be introduced from the mixers, filters, and passive components, such as capacitors. The errors are exacerbated if they cause imbalance between the I and Q paths. In an effort to estimate the channel and, thus, zero-out some of these errors, communication systems may use a message format that includes a training sequence, which may be a repeated or predetermined data symbol. Using an Orthogonal Frequency Division Multiplexing (OFDM) system for example, the same IQ constellation point may be transmitted repeatedly for each subcarrier.

In an effort to save power in portable battery-operated devices, some OFDM systems use only a single modulation symbol for training. For example, a unique direction in the constellation (e.g., the I path) is stimulated, while the other direction (e.g., the Q path) is not. The same type of unidirectional training may also be used with pilot tones. Note: scrambling a single modulation channel (e.g., the I channel) with ±1 symbol values does not rotate the constellation point, and provides no stimulation for the quadrature channel.

In the presence of quadrature path imbalance, which is prevalent in large bandwidth systems, the above-mentioned power-saving training sequence results in a biased channel estimate. A biased channel estimate may align the IQ constellation well in one direction (i.e., the I path), but provide quadrature imbalance in the orthogonal direction. It is preferable that any imbalance be equally distributed among the two channels.

FIG. 2 is a schematic diagram illustrating quadrature imbalance at the receiver side (prior art). Although not shown, transmitter side imbalance is analogous. Suppose that the Q path is the reference. The impinging waveform is $\cos(wt+\theta)$, where $\theta$ is the phase of the channel. The Q path is down-converted with $-\sin(wt)$. The I path is down-converted with $(1+2\epsilon)\cos(wt+2\Delta\phi)$. $2\Delta\phi$ and $2\epsilon$ are hardware imbalances, respectively a phase error and an amplitude error. The low pass filters $H_I$ and $H_Q$ are different for each path. The filters introduce additional amplitude and phase distortion. However, these additional distortions are lumped inside $2\Delta\phi$ and $2\epsilon$. Note: these two filters are real and affect both +w and −w in an identical manner.

Assuming the errors are small:

The first component on the right hand side, $\cos(wt)$, is the ideal I path slightly scaled. The second component, $-2\Delta\phi \cdot \sin(wt)$, is a small leakage from the Q path. After down-conversion of the impinging waveform:

in the I path: $(1+2\epsilon)\cos(\theta)+2\epsilon \cdot \sin(\theta)$.

in the Q path: $\sin(\theta)$.

The errors result in the misinterpretation of symbol positions in the quadrature modulation constellation, which in turn, results in incorrectly demodulated data.

SUMMARY

Wireless communication receivers are prone to errors caused by a lack of tolerance in the hardware components associated with mixers, amplifiers, and filters. In quadrature demodulators, these errors can also lead to imbalance between the I and Q paths, resulting in improperly processed data.

A training signal can be used to calibrate receiver channels. However, a training signal that does not stimulate both the I and Q paths, does not address the issue of imbalance between the two paths. An unbiased training signal can be used to stimulate both the I and Q paths, which results in a better channel estimate. Conventionally, channel estimates are derived from predetermined information associated with the positive or reference (+f) subcarriers. Better channel estimates can be obtained if the negative or mirror (−f) subcarriers are also used. Further, by the proper combination of adjacent or nearly adjacent reference subcarriers, with adjacent or nearly adjacent mirror subcarriers, a frequency smoothing can be applied to a training signal that acts as a means of removing channel bias errors.

Accordingly, a method is provided for supplying a frequency-smoothed communications training signal. The method generates a frequency-smoothed unbiased training signal in a quadrature modulation transmitter. The frequency-smoothed unbiased training signal includes a plurality of pilot signal products, where each pilot signal product includes complex plane information represented by a reference frequency subcarrier, multiplying complex plane information represented by mirror frequency subcarrier. The sum of the plurality of pilot signal products is equal to zero. The method supplies the frequency-smoothed unbiased training signal so that it may be transmitted within a single symbol period.

Typically, the frequency-smoothed unbiased training signal includes a plurality of adjacent reference frequency subcarriers and a plurality of adjacent mirror frequency subcarriers. For example, the frequency-smoothed unbiased training signal may include a group of adjacent reference frequency subcarriers, without intervening subcarriers, and a plurality of adjacent mirror frequency subcarriers, without intervening subcarriers.

In one aspect, the frequency-smoothed unbiased training signal may be represented as follows:

$\Sigma\, p_i\, p_{im} = 0$, from i=1 to n;

where p is a reference frequency subcarrier
where $p_m$ is a mirror frequency subcarrier, and
where n is equal to the number of pilot signal products.

A method is also provided for calculating a channel estimate using a frequency-smoothed unbiased training signal. This method accepts a frequency-smoothed unbiased training sequence in a quadrature demodulation receiver. The frequency-smoothed unbiased training sequence includes a plurality of a plurality of pilot signal products, wherein each pilot signal product includes predetermined complex plane information (p) represented by a reference frequency subcarrier (f), multiplying predetermined complex plane information ($p_m$) represented by mirror frequency subcarrier (−f). The sum of the plurality of pilot signal products is equal to zero. The method processes the frequency-smoothed unbiased training signal, generating a plurality of processed symbols (y) representing complex plane information. Each processed symbol (y) is multiplied by a conjugate of a corresponding reference signal (p*), and a frequency-smoothed channel estimate (h) is obtained.

Additional details of the above-described method, systems for generating frequency-smoothed unbiased training signals, and systems for calculating a channel estimate using a frequency-smoothed unbiased training signal are presented below.

DETAILED DESCRIPTION

Figure 1:
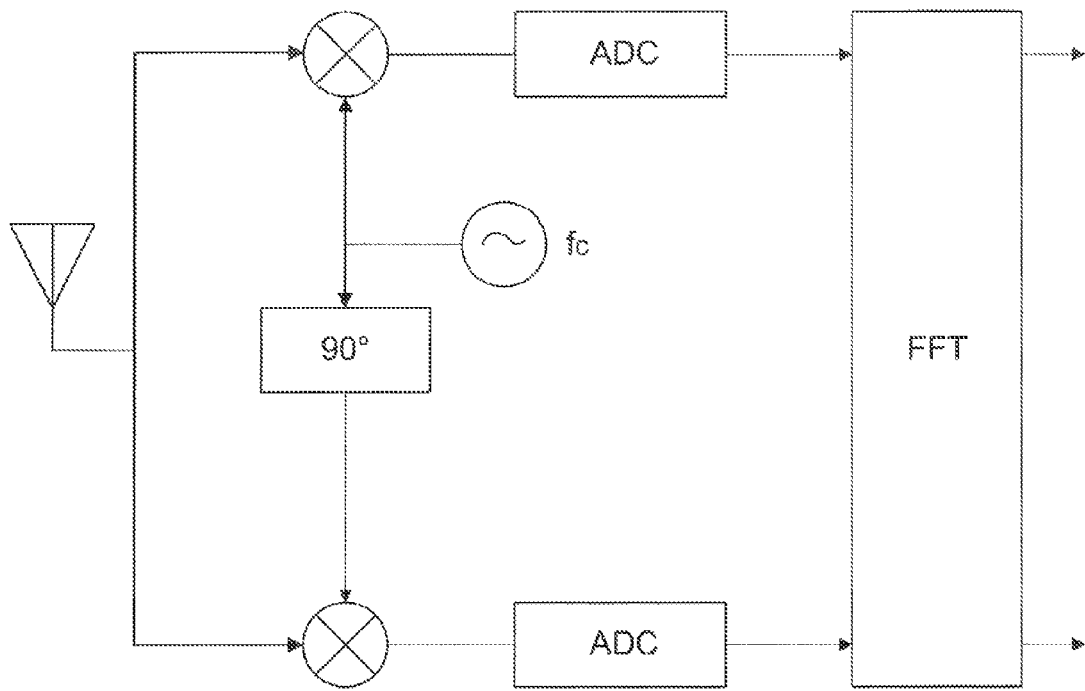
FIG. 1 is a schematic block diagram of a conventional receiver front end (prior art).
Figure 2:
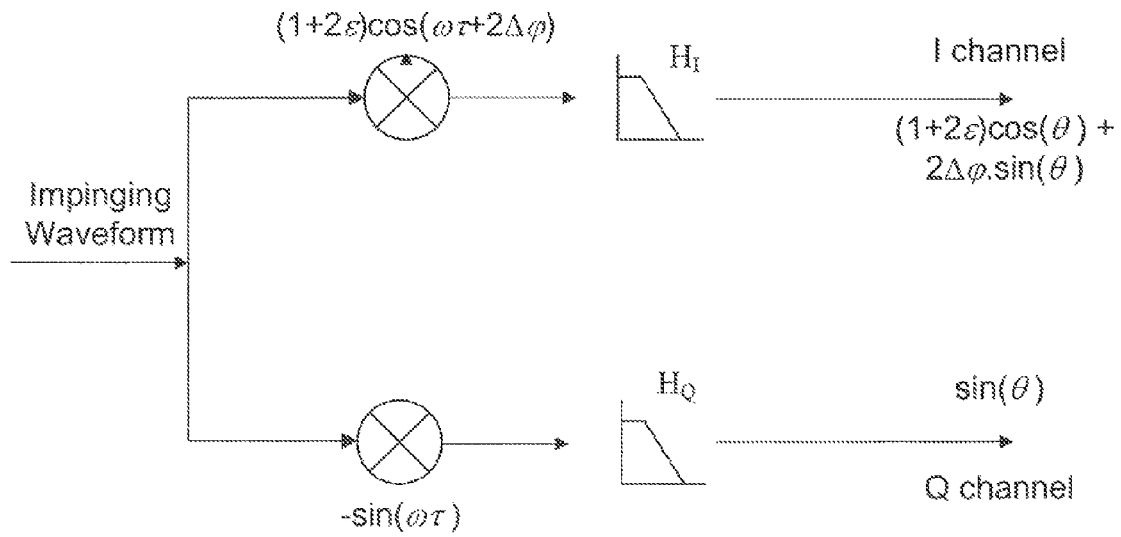
FIG. 2 is a schematic diagram illustrating quadrature imbalance at the receiver side (prior art).

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "processor", "processing device", "component," "module," "system," and the like are intended to refer to a computer-related entity, either hardware, firmware, a combination of hardware and software, software, or software in execution. For example, a component may be, but is not limited to being, a process running on a processor, generation, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

The various illustrative logical blocks, modules, and circuits that have been described may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the node, or elsewhere. In the alternative, the processor and the storage medium may reside as discrete components in the node, or elsewhere in an access network.

Figure 3:
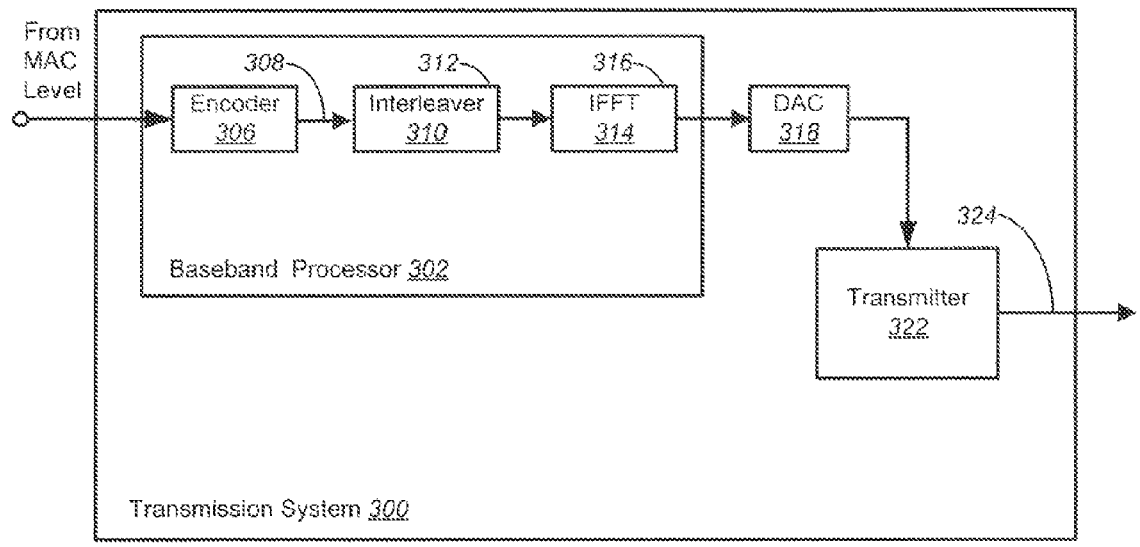
FIG. 3 is a schematic block diagram depicting an exemplary data transmission system.

FIG. 3 is a schematic block diagram depicting an exemplary data transmission system 300. A baseband processor 302 has an input on line 304 to accept digital information form the Media Access Control (MAC) level. In one aspect, the baseband processor 302 includes an encoder 306 having an input on line 304 to accept digital (MAC) information and an output on line 308 to supply encoded digital information in the frequency domain. An interleaver 310 may be used to interleave the encoded digital information, supplying interleaved information in the frequency domain on line 312. The interleaver 310 is a device that converts the single high speed input signal into a plurality of parallel lower rate streams, where each lower rate stream is associated with a particular subcarrier. An inverse fast Fourier transform (IFFT) 314 accepts information in the frequency domain, performs an IFFT operation on the input information, and supplies a digital time domain signal on line 316. A digital-to-analog converter 318 converts the digital signal on line 316 to an analog baseband signal on line 320. As described in more detail below, a transmitter 322 modulates the baseband signal, and supplies a modulated carrier signal as an output on line 324. Note: alternate circuitry configurations capable of performing the same functions as described above would be known by those with skill in the art. Although not explicitly shown, a receiver system would be composed of a similar set of components for reverse processing information accepted from a transmitter.

Figure 4:
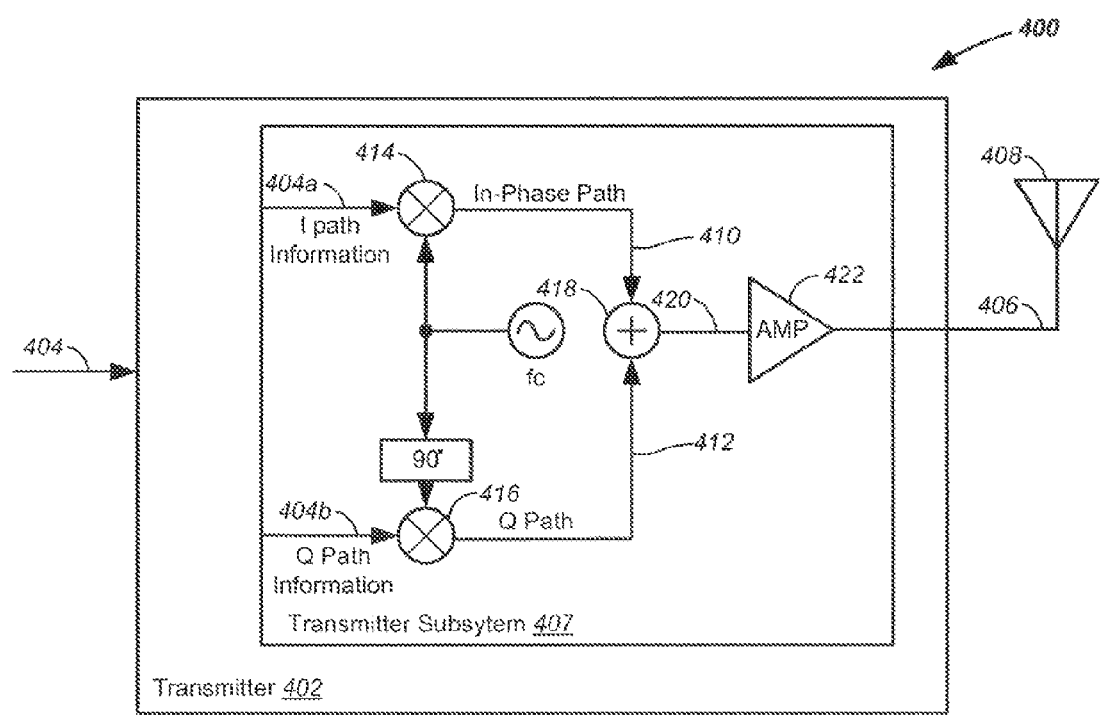
FIG. 4 is a schematic block diagram of a system or device for supplying a frequency-smoothed unbiased training signal.

FIG. 4 is a schematic block diagram of a system or device for supplying a frequency-smoothed unbiased training signal. The system 400 comprises a transmitter or signal generator means 402 having an input on line 404 to accept training information, typically in digital form. For example, the information may be supplied from the MAC level. The transmitter 402 has an output on line 406 to supply a quadrature modulated frequency-smoothed unbiased training signal.

The transmitter 402 may include a transmitter subsystem 407, such as a radio frequency (RF) transmitter subsystem that uses an antenna 408 to communicate via an air or vacuum media. However, it should be understood that the invention is applicable to any communication medium (e.g., wireless, wired, optical) capable of carrying quadrature modulated information. The transmitter subsystem 407 includes an in-phase (I) modulation path 410, or a means for generating I modulation training information. The transmitter subsystem 407 also includes a quadrature (Q) modulation path 412, or a means for generating Q modulation training information. I path information on line 404a is upconverted at mixer 414 with carrier fc, while Q path information on line 404b is upconverted at mixer 416 with a phase shifted version of the carrier (fc+90°). The I path 410 and Q path 412 are summed at combiner 418 and supplied on line 420. In some aspects, the signal is amplified at amplifier 422 and supplied to antenna 408 on line 406, where the frequency-smoothed unbiased training signals are radiated. The I and Q paths may alternately be referred to as I and Q channels. A frequency-smoothed unbiased training signal may also be referred to as a frequency-balanced training sequence, and is part of a larger class of balanced or unbiased training signals described in parent applications, and in detail below.

The frequency-smoothed unbiased training signal includes a plurality of pilot signal products, where each pilot signal product includes complex plane information represented by a reference frequency subcarrier, multiplying complex plane information represented by mirror frequency subcarrier. The sum of the plurality of pilot signal products is equal to zero. The transmitter 402 supplies the frequency-smoothed unbiased training signal within a single symbol period.

Alternately but not shown, the components of the frequency-smoothed training signal (FSTS) are serially supplied or supplied in batches, and collected, in a memory (not shown) for example. Once the entire FSTS is collected, it can be supplied for use within a single symbol period. In this aspect, the memory/collection and combinations means may be considered to be part of the transmitter 402, even if they are enabled in separate modules or devices (not shown). It should also be understood that in some aspects the transmitter 402 acts as a signal generation, while the actual sending of the FSTS over a communication medium is performed by other modules or devices.

Typically, the transmitter 402 also sends quadrature modulated (non-predetermined) communication data. The frequency-smoothed unbiased training signal is used by a receiver (not shown) to create channel estimates, which permit the non-predetermined communication data to be recovered more accurately. In one aspect, the quadrature modulated communication data is sent subsequent to sending the unbiased training sequence. In another aspect, the unbiased training sequence is sent concurrently with the communication data in the form of pilot signals. The system is not limited to any particular temporal relationship between the training signal and the quadrature modulated communication data.

A message is a grouping of symbols in a predetermined format. A message may have a duration of several symbols periods. One or more symbols may be transmitted every symbol period. Some messages include a preamble preceding the main body of the message. For example, a message may be formed as a long packet containing many OFDM, CDMA, or TDMA symbols.

The FSTS may be comprised of 2, or more than 2 pilot signal products. In one aspect, the transmitter 402 generates a frequency-smoothed unbiased training signal including a plurality of adjacent reference frequency subcarriers and a plurality of adjacent mirror frequency subcarriers. Typically, the reference subcarriers and corresponding mirror subcarriers are within a relatively close (spectrum-wise) proximity. For example, the frequency-smoothed unbiased training signal may include a group of adjacent reference frequency subcarriers, without intervening subcarriers, and a plurality of adjacent mirror frequency subcarriers, without intervening subcarriers. An intervening subcarrier may, for example, be a subcarrier carrying communication (non-predetermined) data or other information not associated with the training signal. In one variation, the group includes all the reference and mirror subcarriers in the FSTS.

In another aspect, the frequency-smoothed unbiased training signal may be represented as follows:

$\Sigma\, p_i\, p_{im} = 0$, from $i=1$ to $n$;

where $p$ is a reference frequency subcarrier where $p_m$ is a mirror frequency subcarrier, and where n is equal to the number of pilot signal products.

As noted above, the sum of the pilot signal products is equal to zero. However, due to system errors, the sum may sometimes be more accurately referred to as about zero. In a worst case analysis, L pilot signal products are integrated as follows:

$$|\text{sum } p_i \cdot p_{im}| = L.$$

If L is 100%, and if a $|\text{sum } p_i \cdot p_{im}| = L/4$, then the error is 25%. A frequency-smoothed unbiased training sequence with a 25% error still yields excellent results. If L/2 is used (a 50% error), good results are obtained, as the IQ interference from the channel estimate still decreases by 6 dB.

As explained in greater detail below, the frequency-smoothed unbiased training signal may be represented using weighted pilot signal products as follows:

$\Sigma w_i \, p_i \, p_{im} = 0$, from i=1 to n;

where w is a weighting factor.

In one aspect, the unique weight associated with some of the pilot signal products may be one (normalized). In some aspects, the individual weighting factors have about the same value, and the weighting factor can be removed from the equation as a constant.

Figure 5:
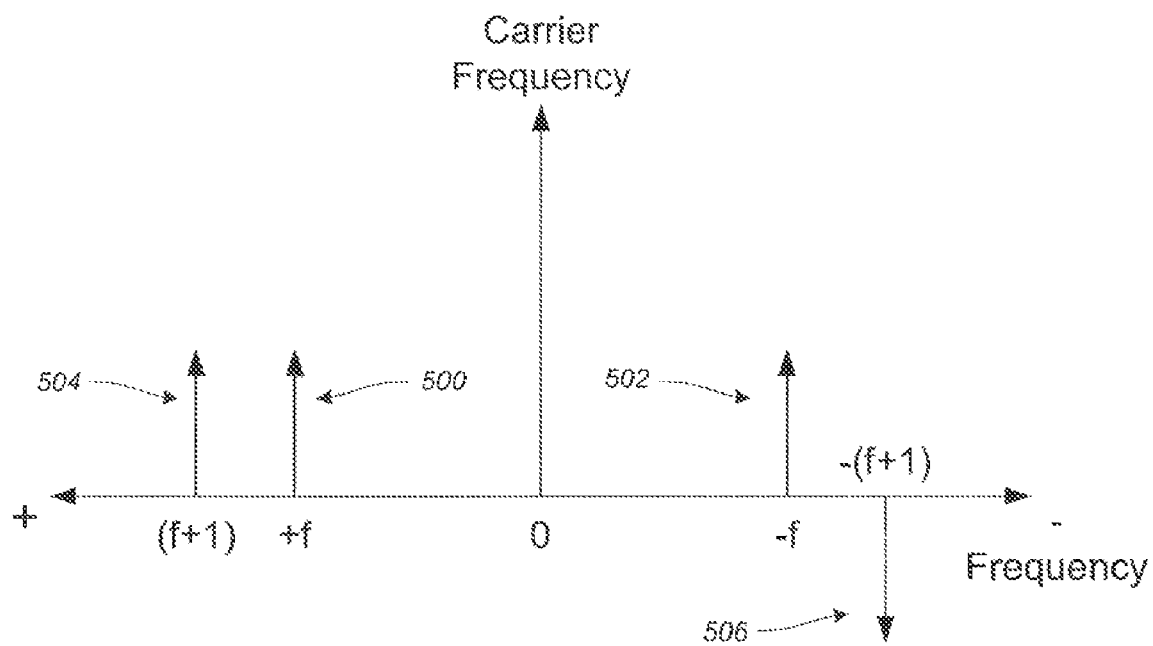
FIG. 5 is a diagram depicting a simple example of a frequency-smoothed unbiased training signal.

FIG. 5 is a diagram depicting a simple example of a frequency-smoothed unbiased training signal. A first pilot signal product has a reference subcarrier 500 at frequency +f representing information as a first complex plane value, and a mirror subcarrier 502 at frequency −f representing the first complex plane value. Here, the subcarrier "arrows" can be thought of as phasors having an amplitude of 1 and an angle of 90 degrees. A second pilot signal product has a reference subcarrier 504 at frequency (f+1), adjacent frequency +f, representing the first complex plane value, and a mirror subcarrier 506 at frequency −(f+1), adjacent the frequency −f, representing the first complex plane value +180 degrees. To continue this example, the arrow representing mirror subcarrier 506 would have an amplitude of 1 and an angle of 270 degrees.

Although all the subcarriers have the same value, normalized to 1, in this example, it should be understood that more complex variations of this example may use non-uniform amplitudes. Likewise, the FSTS is not limited to the use of only 90 degree and 270 degree angles. Further, although only a 2 pilot signal example is shown, the same methodology would apply to a FSTS with more than 2 pilot signal products. For example, the depicted FSTS could be modified to add a third pilot signal product (not shown) with subcarrier at frequency (f−1), adjacent frequency +f, representing the first complex plane value, and a mirror subcarrier at frequency −(f−1), adjacent the frequency −f, representing the first complex plane value +180 degrees.

Figure 6:
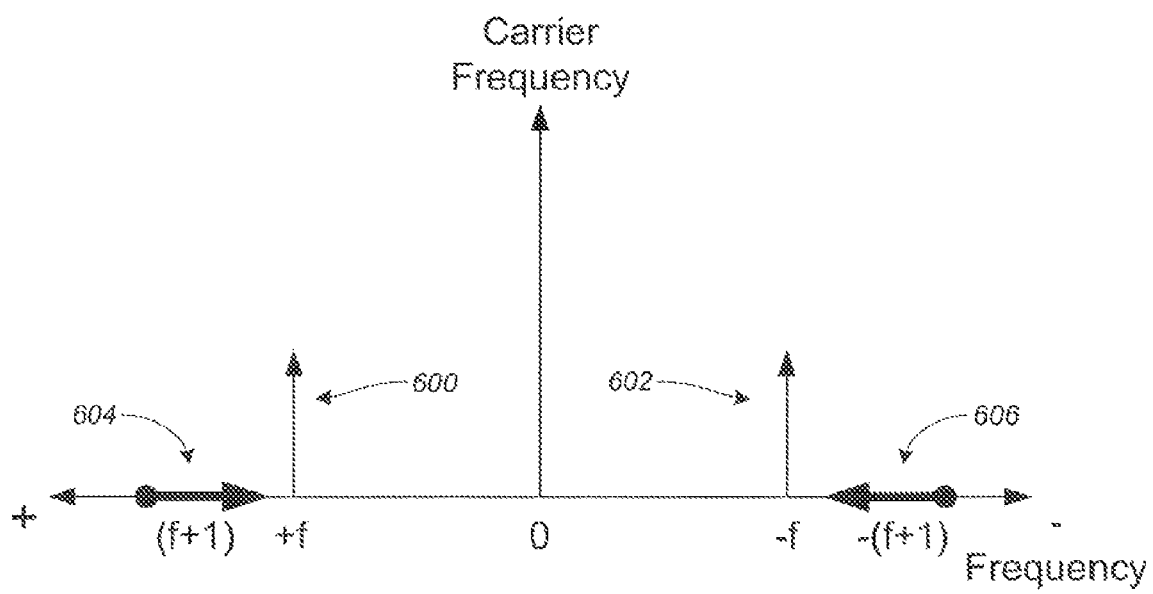
FIG. 6 is a diagram depicting a second example of frequency-smoothed unbiased training signal.

FIG. 6 is a diagram depicting a second example of frequency-smoothed unbiased training signal. A first pilot signal product has a reference subcarrier 600 at frequency +f representing information as a first complex plane value, and a mirror subcarrier 602 at frequency −f representing the first complex plane value. Again, the subcarrier "arrows" can be thought of as phasors having an amplitude of 1 and an angle of 90 degrees. A second pilot signal product has a reference subcarrier 604 at frequency (f+1), adjacent frequency +f, representing the first complex plane value +90 degrees, and a mirror subcarrier 606 at frequency −(f+1), adjacent frequency −f, representing the first complex plane value −90 degrees. To continue this example, the arrow representing reference subcarrier 604 would have an amplitude of 1 and an angle of 180 degrees, and the mirror subcarrier 606 would have an amplitude of 1 and an angle of 0 degrees.

Again, the subcarriers have the same value in this example, normalized to 1, and it should be understood that more complex variations of this example may use non-uniform amplitudes. Likewise, the FSTS is not limited to the use of only 0 degree, 90 degree, and 180 degree angles. Further, although only a 2 pilot signal example is shown, the same methodology would apply to a FSTS with more than 2 pilot signal products. For example, the depicted FSTS could be modified to add a third pilot signal product (not shown) with subcarrier at frequency (f−1), adjacent frequency +f, representing the first complex plane value +90 degrees, and a mirror subcarrier at frequency −(f−1), adjacent the frequency −f, representing the first complex plane value −90 degrees.

Figure 7:
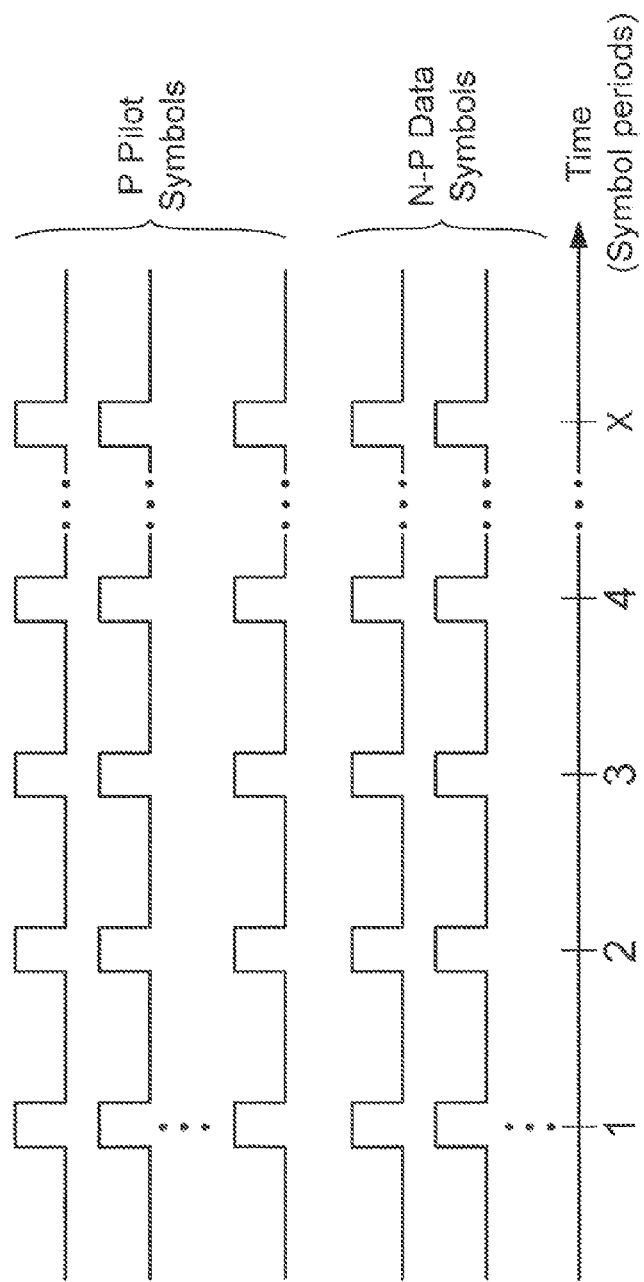
FIG. 7 is a diagram depicting an unbiased training signal enabled as a group of pilot symbols accompanying communication symbols.

FIG. 7 is a diagram depicting an unbiased training signal enabled as a group of pilot symbols accompanying communication symbols. In one aspect, in addition to accepting training information, the transmitter accepts (non-predetermined) communication data. Then, an unbiased frequency-smoothed training signal is generated with P pilot signal products, along with (N−P) communication data symbols (subcarriers). In total, N subcarriers are supplied in one symbol period, including the frequency-smoothed unbiased training signal and quadrature modulated communication data. Many communications systems, such as those compliant with IEEE 802.11 and UWB use pilot tones for channel training purposes.

Alternately, the components of the frequency-smoothed training signal (FSTS), or the communication data symbols, or both, may be serially supplied or supplied in batches, and collected, in a memory (not shown). Once all the symbols in the symbol period are collected, they can be supplied for use within a single symbol period. In this aspect, the memory/collection and combinations means may be considered to be part of the transmitter, even if they are enabled in separate modules or devices.

Figure 8:
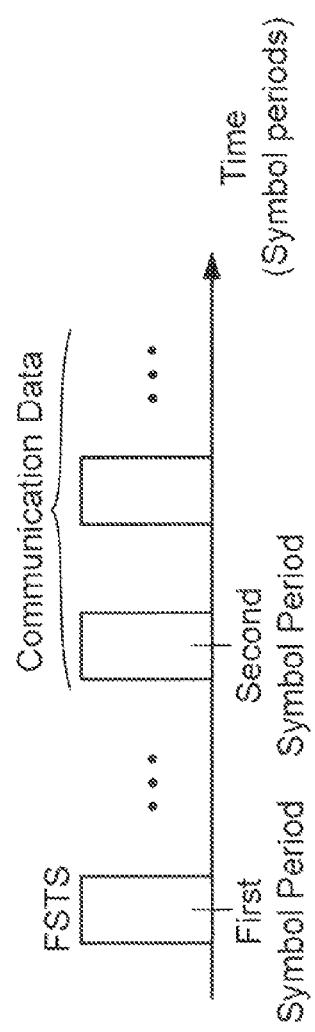
FIG. 8 is a diagram depicting a frequency-smoothed unbiased training signal enabled as a preamble preceding non-predetermined communication data.

FIG. 8 is a diagram depicting a frequency-smoothed unbiased training signal enabled as a preamble preceding non-predetermined communication data. As shown, the transmitter supplies the frequency-smoothed unbiased training signal in a first symbol period using a group of reference frequency subcarriers and corresponding mirror frequency subcarriers. The transmitter accepts communication data, generates quadrature modulated communication data on the group of reference frequency subcarriers and corresponding mirror frequency subcarriers, and supplies the quadrature modulated communication data in a second symbol period, subsequent to the first symbol period.

Although only a first and second symbol period are explicitly marked, it should be understood that the preamble may be comprised of a plurality of symbol periods, with an FSTS used in some or all of the preamble symbol periods. Likewise, communication data may be supplied in a plurality of symbol periods (as shown) following the preamble. For example, an Ultra Wideband (UWB) system uses 6 symbol periods transmitted prior to the transmission of communication data or a beacon signal. Therefore, one or more of the 6 symbol periods may be used for the transmission of a FSTS.

Although not specifically depicted, the transmitter of FIG. 4, or elements of the transmitter may be enabled as a processing device for generating a frequency-smoothed unbiased training signal. In that case, the processing device would comprise a signal generator module having an input to accept training information and an output to supply a quadrature modulated frequency-smoothed unbiased training signal. As above, the frequency-smoothed unbiased training signal would include a plurality of pilot signal products, where each pilot signal product includes complex plane information represented by a reference frequency subcarrier, multiplying complex plane information represented by mirror frequency subcarrier. Also as above, the sum of the plurality of pilot signal products is equal to zero. The signal generator module would supply the frequency-smoothed unbiased training signal within a single symbol period.

Figure 9:
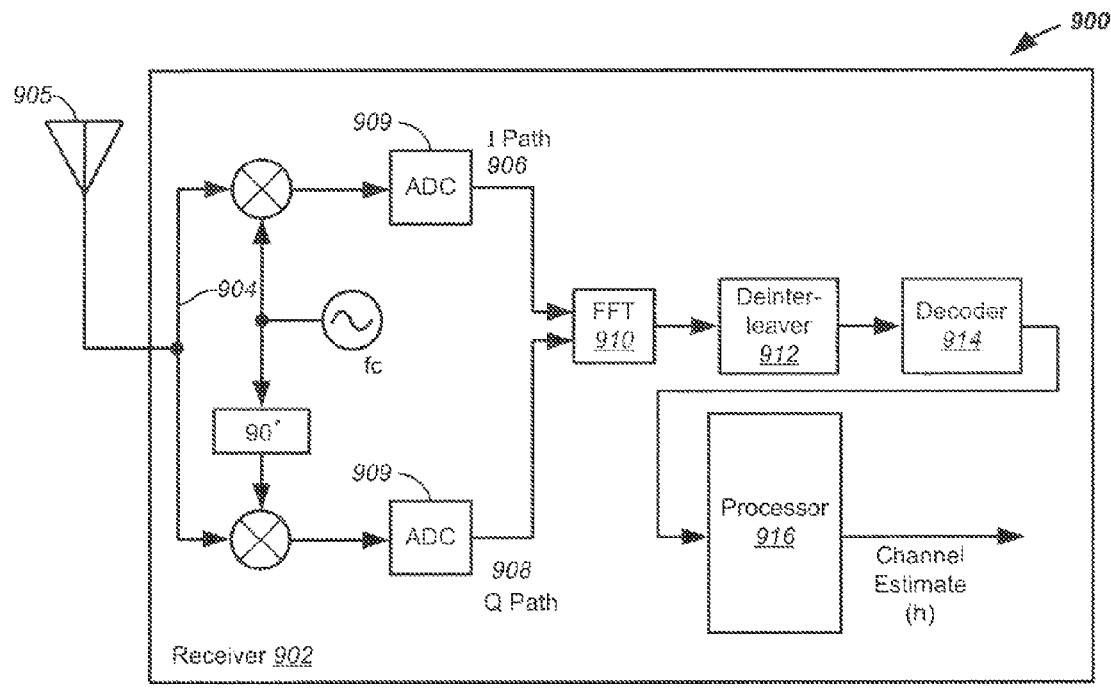
FIG. 9 is a schematic block diagram of a system or device for calculating a channel estimate using a frequency-smoothed unbiased training signal.

FIG. 9 is a schematic block diagram of a system or device for calculating a channel estimate using a frequency-smoothed unbiased training signal. The system or device 900 comprises a quadrature demodulation receiver or receiving means 902 having an input on line 904 to accept a frequency-smoothed unbiased training signal. As with the transmitter of FIG. 4, the receiver 902 may be an RF device connected to an antenna 905 to receive radiated information. However, the receiver may alternately receive the unbiased training sequence via a wired or optical medium (not shown).

The receiver 902 has an in-phase (I) demodulation path 906 for accepting I demodulation training information. A quadrature (Q) demodulation path 908 accepts Q demodulation training information. As is conventional, the receiver 902 includes analog-to digital converters (ADC) 909, a fast Fourier transformer (FFT) 910, a deinterleaver 912, and a decoder 914. The receiver supplies training information in response to receiving the FSTS. The frequency-smoothed unbiased training sequence includes a plurality of a plurality of pilot signal products. A pilot signal product includes predetermined complex plane information (p) represented by a reference frequency subcarrier (f), multiplied by predetermined complex plane information ($p_m$) represented by mirror frequency subcarrier (−f). The sum of the plurality of pilot signal products is equal to zero.

A processor or processing means 916 has an input on line 918 to accept the training information, the processor generates a plurality of processed symbols (y) representing complex plane information. The processor 916 multiplies each processed symbol (y) by a conjugate of a corresponding reference signal (p*), and supplies a frequency-smoothed channel estimate (h) at an output on line 920. In some aspects, the receiver 902 supplies the training information as the output of the ADCs 909. In this aspect, the FFT, deinterleaver, and decoder processes, or their equivalent, are performed by processor 916.

The FSTS is comprised of 2 or more pilot signal products. In one aspect, the receiver accepts a frequency-smoothed unbiased training signal including a plurality of adjacent reference frequency subcarriers and a plurality of adjacent mirror frequency subcarriers. The meaning of "adjacent" is dependent upon subcarrier spacing, frequency, and other modulation characteristics. In another aspect, the frequency-smoothed unbiased training signal includes a group of adjacent reference frequency subcarriers, without intervening subcarriers, and a plurality of adjacent mirror frequency subcarriers, without intervening subcarriers. This group may include all, or only a subset of all the subcarriers in the FSTS.

The received frequency-smoothed unbiased training signal may be expressed as the transmitted FSTS, as follows:

$\Sigma\ p_i\ p_{im} = 0$, from i=1 to n;
where p is a reference frequency subcarrier
where $p_m$ is a mirror frequency subcarrier, and
where n is equal to the number of pilot signal products.

Like the transmitted FSTS, the received FSTS may include weighted pilot signal products as follows:

$\Sigma\ w_i\ p_i\ p_{im} = 0$, from i=1 to n;
where w is a weighting factor.

Two examples of a transmitted FSTS have been described in FIGS. 5 and 6. These same examples are valid examples of a received FSTS.

In one aspect, the receiver 902 may accept an unbiased frequency-smoothed training signal with P pilot signal products and (N−P) communication data symbols in the same symbol period, and supply both training information and communication data, also see FIG. 7. In another aspect, the receiver 902 accepts a frequency-smoothed unbiased training signal in a first symbol period, with a group of reference frequency subcarriers and corresponding mirror frequency subcarriers. The receiver also accepts quadrature modulated communication data on the group of reference frequency subcarriers and corresponding mirror frequency subcarriers in a second symbol period, subsequent to the first symbol period, and supplies communication data, see FIG. 8.

Although not specifically shown, the receiver of FIG. 9 may also be enabled as a processing device for calculating a channel estimate using a frequency-smoothed unbiased training signal. In this instance, the processing device comprises a receiver module having an input to accept a frequency-smoothed unbiased training sequence and an output to supply training information. As above, the frequency-smoothed unbiased training sequence includes a plurality of pilot signal products, where each pilot signal product includes predetermined complex plane information (p) represented by a reference frequency subcarrier (f), multiplying predetermined complex plane information ($p_m$) represented by mirror frequency subcarrier (−f). Also as above, the sum of the plurality of pilot signal products is equal to zero.

A calculation module has an input to accept the training information. The calculation module generates a plurality of processed symbols (y) representing complex plane information, multiplies each processed symbol (y) by a conjugate of a corresponding reference signal (p*), and supplies a frequency-smoothed channel estimate (h) at an output.

Training signals, whether enabled in a preamble or as pilot signals are similar in that the information content of transmitted data is typically predetermined or "known" data that permits the receiver to calibrate and make channel measurements. When receiving communication (non-predetermined) data, there are 3 unknowns: the data itself, the channel, and noise. The receiver is unable to calibrate for noise, since noise changes randomly. Channel is a measurement commonly associated with delay and multipath. For relatively short periods of time, the errors resulting from multipath can be measured if predetermined data is used, such as training or pilot signals. Once the channel is known, this measurement can be used to remove errors in received communication (non-predetermined) data. Therefore, some systems supply a training signal to measure a channel before data decoding begins.

However, the channel can change, for example, as either the transmitter or receiver moves in space, or the clocks drift. Hence, many systems continue to send more "known" data along with the "unknown" data in order to track the slow changes in the channel.

Although not specifically shown, the transmitter of FIG. 4 and the receiver of FIG. 9 may be combined to form a transceiver. In fact, the transmitter and receiver of such a transceiver may share elements such as an antenna, baseband processor, and MAC level circuitry. The explanations made above are intended to describe a transceiver that both transmits unbiased training sequences and calculates unbiased channel estimates based upon the receipt of unbiased training sequences from other transceivers in a network of devices.

Functional Description

Modern high data rate communication systems transmit signals on two distinct channels, the in-phase and quadrature-phase channels (I and Q). The two channels form a 2D constellation in a complex plane. QPSK and QAM are examples of constellations. The I and Q channels may be carried by RF hardware that cannot be perfectly balanced due to variations in RF components, which results in IQ imbalance. In the increasingly common direct conversion systems, the imbalance issued are even greater. IQ imbalance distorts the constellation and results in crosstalk between the I and Q channels: the signal interferes with itself. Increasing transmission power does not help, since self-generated interference increases with the signal power. The signal-to-noise ratio (SINR) reaches an upper bound that puts a limit on the highest data rate attainable with a given RF hardware. In order to increase the data rate, a costly solution is to use fancier, more expensive hardware. A possibly less costly solution is to digitally estimate IQ imbalance and compensate for it. The concepts of digital estimation and compensation algorithms have been previously advanced in the art. However, the solutions tend to be expensive because they do not rely on a special type of training sequence. These solutions often only consider imbalance at one side, usually at the receiver.

Examples are given below that focus on Orthogonal Frequency Division Multiplexing (OFDM), with insights for time domain systems, which study end-to-end imbalance, from transmitter to receiver. Moreover, in OFDM the imbalance is modeled as a function of frequency, taking into account variations in the frequency response of the filters.

Two kinds of enhancements are presented: one with zero cost that eliminates the interference from the channel estimate by using an unbiased training sequence. Substantial gains are achieved because the error of the channel estimate is often more detrimental to performance than the error in the data itself. A second, relatively low cost, enhancement compensates for data distortion, if more gain is needed.

A model of the IQ imbalance is provided below. Analysis is provided to show how conventional channel estimation using unbiased training sequences can mitigate part of the IQ imbalance. Then, a straightforward extension is provided to calculate the IQ imbalance parameters, proving that the algorithms are effective. Using the estimated parameters, a simple compensation algorithm is presented to mitigate data distortion. Simulation results for WiMedia's UWB are also given, as well as suggestions to amend the standard.

IQ Imbalance Model

IQ imbalance arises when the power (amplitude) balance or the orthogonality (phase) between the in-phase (I) and quadrature-phase (Q) channels is not maintained. IQ imbalance is therefore characterized by an amplitude imbalance $2\epsilon$ and a phase imbalance $2\Delta\phi$.

Time Domain Signals

A complex symbol x is transmitted and received via the I and Q channels. In an ideal noiseless channel, the symbol x is received intact. But in the presence of IQ imbalance, a noisy or distorted version is likely received.

$$Y = \alpha x + \beta x^*, \quad (1)$$

where $$A = \cos(\Delta\phi) + j\epsilon \sin(\Delta\phi),$$

$$B = \epsilon \cos(\Delta\phi) - j \sin(\Delta\phi) \quad (2)$$

are complex quantities modeling the imbalance, $\alpha \approx 1$ and $\beta \approx 0$. Nonlinear model (1) is linearized via the vector form $$\begin{pmatrix} y \\ y^* \end{pmatrix} = \begin{pmatrix} \alpha & \beta \\ \beta^* & \alpha^* \end{pmatrix} \begin{pmatrix} x \\ x^* \end{pmatrix} \quad (3)$$

$$\rightarrow Y = BX.$$

B is the imbalance matrix. The second row is obsolete since it is a duplicate version of the first row. But it gives a same size and type input and output so imbalance blocks at transmitter and receiver can be concatenated, as described below. The imbalance matrix at the transmitter is defined by $B_t$, and at the receiver it is defined by $B_r$.

One-Tap Channel

A one-tap channel is considered, suitable for OFDM. A one-tap channel h in appropriate matrix form is $$H = \begin{pmatrix} h & 0 \\ 0 & h^* \end{pmatrix}. \quad (4)$$

With imbalance at transmitter and receiver, and in average while Gaussian (AWGN) noise n, vector form $N=(n\ n^*)^T$, the received signal is expressed as a concatenation of linear blocks $$Y = B_r H B_t X + N \quad (5)$$

$$\triangleq H'X + N$$

$$\triangleq \begin{pmatrix} h' & \beta' \\ \beta'^* & h'^* \end{pmatrix}\begin{pmatrix} x \\ x^* \end{pmatrix} + \begin{pmatrix} n \\ n^* \end{pmatrix}$$

$$\rightarrow y = h'x + \beta'x^* + n.$$

The overall result is that IQ imbalance and channel combine to create a global channel h', plus an undesired distortion or interference characterized by a global imbalance parameter β'. The global imbalance parameter β' changes when the channel changes, and may need to be estimated regularly.

Next, the condition is considered where the symbol x, rather than spanning the entire complex plane, is restricted to a given (1D) axis. For example, the axis may be associated with BPSK modulation, the real axis, the imaginary axis, or any axis in between. In this case, $x^*=kx$ may be written, where k is a complex constant (a rotation), and $$Y = (h' + \beta'k)x + n \quad (6)$$

$$\triangleq h''x + n.$$

If x is restricted to a unique axis, IQ imbalance vanishes, becoming an integral part of an overall channel response.

Frequency Domain Signals

While the previous model applies to time domain signals, a modification is now considered where the signal of interest x is given in frequency domain, at frequency f. In time domain, this signal is carried by a complex tone, $xe^{j2\pi ft}$. Replacing terms in equation (1), the following is obtained $$\alpha x e^{j2\pi ft} + \beta x^* e^{-j2\pi ft}. \quad (7)$$

In OFDM, the interference created by IQ imbalance does not show up at the same frequency f, but rather at the mirror frequency −f, and vice versa. What is transmitted at −f creates interference on frequency +f. If signal $x_m$ is the signal transmitted at frequency −f, where index m denotes a quantity at mirror frequency −f, then at frequency −f the following is obtained $$\alpha_m x_m e^{-j2\pi ft} + \beta_m x_m^* e^{j2\pi ft}. \quad (8)$$

A generalization of the time domain equations has been used. The IQ imbalance parameters α and β are here a function of frequency. This models an imbalance due to different low-pass (base-band) or band-pass (IF) filters in the system. The I and Q paths cannot have the exact same filters and, hence, the imbalance varies with frequency. In time domain systems, this kind of imbalance exists but it is very expensive to compensate. An equalizer and an extension of the model to deal with different convolutions on different channels are required. So in the time domain, bulk or average imbalance is used. Frequency domain systems are able to take advantage of the plain equalizer structure and model the imbalance on a per frequency basis.

If the output of equations (7) and (8) are combined per subcarrier, the following is observed $$Y = (\alpha x + \beta_m x_m^*) e^{j2\pi ft}$$

$$y_m = (\alpha_m x_m + \beta x^*) e^{-j2\pi ft}. \quad (9)$$

Omitting the subcarriers (automatically handled by the FFT), a linear model function of signals at +f and −f can be written as $$\begin{pmatrix} y \\ y_m^* \end{pmatrix} = \begin{pmatrix} \alpha & \beta_m \\ \beta^* & \alpha_m^* \end{pmatrix} \begin{pmatrix} x \\ x_m^* \end{pmatrix} \quad (10)$$

$$\rightarrow Y = BX.$$

In the frequency domain model, the second row is no longer obsolete. The model deals, in one shot, with a pair of mirror frequencies. A one-tap channel h at frequency f, and $h_m$ at frequency −f is modeled by the matrix $$H = \begin{pmatrix} h & 0 \\ 0 & h_m^* \end{pmatrix}. \quad (11)$$

AWGN noise n at frequency f, and $n_m$ at frequency −f form the noise vector $N = (n \ n_m^*)^T$. The end to end model is $$Y = B_r H B_t X + N \quad (12)$$

$$\triangleq H'X + N$$

$$\triangleq \begin{pmatrix} h' & \beta_m' \\ \beta'^* & h_m'^* \end{pmatrix} \begin{pmatrix} x \\ x_m^* \end{pmatrix} + \begin{pmatrix} n \\ n_m^* \end{pmatrix}$$

$$\rightarrow y = h'x + \beta_m' x_m^* + n$$

$$y_m = h_m' x_m + \beta' x^* + n_m$$

h', $h_m$' are the global channel taps, and β', $\beta_m$' are the global imbalance parameters. The imbalance parameters change when the channels change and may need to be estimated regularly.

Since IQ imbalance generates interference exclusively from the mirror frequency, two interesting cases are noteworthy. If at the mirror frequency no signal is transmitted, or the channel is in a fade, no interference is created. If on the other hand, the signal or channel is strong, the interference can be strong. Hence, in OFDM, the effect of IQ imbalance is more problematic.

Conventional Channel Estimation

Before examining the compensation algorithms, it is shown how half of the problem can be solved at no cost, simply by using an unbiased training sequence. An unbiased training sequence fully eliminates the interference from the channel estimate, noticeably improving performance. In fact, the error in the channel estimate is often more detrimental than the error in the data, because the channel estimate tends to create a bias in the constellation.

The model (12) is stimulated with pilot tones. At frequency +f, the pilot p is transmitted, and at frequency −f, the pilot $p_m$. Assuming, without loss of generality, that the pilots have a unit norm (the channel carries the effective power), the conventional channel estimate at frequency f is obtained by de-rotating by p*

$$\hat{H} = h'pp^* + \beta_m' p_m^* p^* + n \quad (13)$$

$$= h' + \beta_m' p_m^* p^* + n$$

By averaging several channel observations, the noise is automatically reduced (for clarity, noise de-rotation is omitted). With regard to the term $\beta_m' p_m^* p^*$, many OFDM systems (e.g., WiMedia's UWB) use a training sequence that is simply a repeated symbol. Therefore, this term does not decay with averaging. Applying a scrambling of +1 or −1 to the entire OFDM symbol does not help, as nothing changes when the sign of both p* and $p_m^*$ are inverted. Rather, the following is accomplished: after cumulating a number of observations, the sum of the products is nullified $$\Sigma_i p_i p_{im} = 0. \quad (14)$$

Often the training sequence consists of an even number of symbols, and it is enough to ensure each pair adds up to zero $$p_1 p_{1m} + p_2 p_{2m} = 0. \quad (15)$$

TABLE 1

Examples of unbiased training sequences

| | |
|---|---|
| $P_2 = jp_1$ | Second training symbol is a 90 degrees rotation of first training symbol. |
| $P_2 = p_1, p_{2m} = -p_{1m}$ | For positive frequencies maintain fixed pilot, for negative frequencies constantly invert the sign. |

Examples of simple sequences that satisfy the condition are given in Table 1. These types of training sequences are denoted as unbiased training sequences because, on one hand, unbiased channel estimates are produced, and on the other, the training signals equally spans the I and Q dimensions of the complex plane in time domain. For example, an unbiased training sequence is not concentrated along just the real axis.

As a proof: consider the unit norm complex scalar $a_i = p_i e^{j\theta} = p_{im} e^{-j\theta}$, halfway between $p_i$ and $p_{im}$. In time domain, the pilots add up to $2a_i \cos(2\pi ft + \theta)$. In time domain and in a given OFDM symbol, the 2 mirror pilots span a unique direction determined by the complex constant $a_i$. If L symbols are transmitted, the total (or average, or cumulated) power in a direction φ is $\Sigma_i |\Re a_i \exp(-j\phi)|^2 = 0.5 L + 0.5 \Re \exp(-2j\phi) \Sigma_i a_i a_i$. This power is constant in any direction φ if and only if $\Sigma_i a_i a_i = \Sigma_i p_i p_{im} = 0$. Uniform spanning of the complex plane is achieved.

IQ Imbalance Estimation

After estimating the global channel h', the estimation of the global imbalance parameter $\beta_m'$ is considered. Careful analysis of equation (12) reveals that this parameter can be obtained in manner very similar way to the conventional channel estimation. That is, $\beta_m'$ can be treated like a "channel" carrying the pilot $p_m^*$. Hence, by de-rotating by $p_m$, an estimate of the imbalance may be obtained. The condition for unbiased estimation of the imbalance is identical to equation (14).

In summary, using unbiased training sequences and two conventional channel estimations, good estimates of the end-to-end channel and imbalance parameter are obtained (Table 2).

TABLE 2

| Estimation algorithm | |
| --- | --- |
| H' | $\beta_m'$ |
| Derotate by p* | Derotate by $p_m$ |

Smoothing Over Adjacent Subcarriers

In addition to averaging over adjacent OFDM symbols, the channel estimate may be smoothed over adjacent subcarriers within one symbol. In OFDM, the cyclic prefix is designed to be short, and the channel is supposed to vary slowly from tone to tone. Likewise, the filters in the RF chain should have short temporal response and their frequency response also varies slowly, i.e., the IQ imbalance varies slowly across subcarriers. The same channel smoothing techniques can be used to smooth and improve the imbalance parameter estimate. By using unbiased training sequences, there is no interaction between the channel estimate and the imbalance estimate. Each estimated can be independently smoothed.

If a unique OFDM symbol is used for estimation, it is impossible to find an unbiased training sequence that satisfies equation (14). In this case, a nearly unbiased training sequence can be obtained by applying the summation from equation (14) over groups of 2 or more adjacent subcarriers. Then smoothing automatically cancels all or part of the interference from mirror frequencies. One solution is to rotate the pilot by 90 degrees on the adjacent subcarrier (moving in mirror directions on the positive and negative frequencies).

The effect of smoothing the channel estimate over adjacent frequencies can be performed using a convolution with a weight vector, rather than a simple averaging of each pilot independently. The same smoothing effect also applies to the IQ imbalance parameter B.

From the channel estimation equations, it can be seen that after averaging over multiple symbol periods (e.g., OFDM symbols), the channel estimate (h) is equal to the original channel h plus some undesired terms:

$$h = h + (1/P) B_m \operatorname{sum}\{p_i^* p_{im}^*\} + n$$

where P is the total pilot power, usually assumed constant from one symbol to the next one. But P does not have to be constant in the general case. "n" is noise, and $p_i$ and $p_{im}$ are, respectively, the pilot of interest at frequency f, and the mirror pilot at frequency −f.

The above equations assume that the averaging occurs for each pair of pilot and mirror pilot, with index i and mirror index im are independently of other pilots (index i' and i'm, for example). That is, each pair can be separately treated, by collecting observed values for each pair over multiple symbols periods, and carrying the average.

However, if adjacent pilots are averaged, a new channel average is obtained as follows:

$$h = h + \operatorname{sum}\{w_{j-i} B_{im} p_i^* p_{im}^*\} + n$$

where the index i now denotes adjacent subcarriers rather than different symbol periods. Index j is the center pilot, and $w_{j-i}$ is the weighting function. Then, the formula $w_{j-i} B_{im} p_i^* p_{im}^*$ can be written as a convolution:

$$\underline{w}^* (B_m p^* p_m^*) = 0$$

Note: the symbol "$*$" denotes a convolution, while "*" (superscript) denotes a complex conjugate.

The weight function w is known and is dependent upon how the channel is averaged. The pilots p and $p_m$ are unknowns. By optimizing the pilots, the value of the equation, which is the undesired noise added to h, can be minimized imbalance parameters $B_m$. The parameter $B_m$ is unknown in this equation and depends on the physical hardware (IQ imbalance). But since $B_m$ is unknown at the time the p and $p_m$ are being optimized, and if it is assumed the averaging over adjacent frequencies means that Bm does not vary noticeably, then is can be assumed that $B_m$ is a constant independent of index i. Hence, the term $B_m$ can be dropped from the equation to obtain $$\underline{w}^* (p^* p_m^*) = 0$$

whose power is minimized for a given waveform w. By constraining the values of p and $p_m$, for example, the power can remain constant as the index i changes.

In the absence of constraints (other than total pilot power), this problem is not excessively hard to solve. The convolution can be written as a Toeplitz matrix W formed by the vector w, times the vector $A = (p^* p_m^*)$. To minimize the power of the convolution WA, i.e., the norm of the vector, is optimally:

$$\min A^H W^H W A$$

Note: "A" contains dependent terms. That is, A(i) and A(im) are equal terms. So only half of "A" is unknown, which makes the problem a bit harder to solve. But if w is symmetric around the origin, then the matrix and vector can be wrapped around in a mirror fashion. What remains is a half-size matrix, and vector W' and A'. Then, the optimal convolution WA is:

$$\min A'^H W'^H W' A'$$

subject to total pilot power being constant. This solution is still not so simple, unless it is assumed that the total pilot power is approximately equivalent, so that the norm of A' is constant. Making this new assumption, then the solution to the problem is the weakest eigenvector of the matrix $W'^H W'$.

Given the many above-mentioned assumptions, the problem is now easily solved. The solution gives an idea of the shape of the pilots. However, one of the assumptions is most often not valid. Usually, the pilots have a very simple structure, such as 1+j, or 1, or j, etc. Otherwise, the pilots have at least a constant norm, hence exp(jθ).

Given this new constraint, the problem can be solved using optimization techniques. Since unbiased training signals with a 25%, or even 50%, error are useful, excellent performance can be achieved. Hence, it is enough to find a simple structure of the pilots that tends to be unbiased without being 100% unbiased, which is difficult to achieve in fact.

Such a structure can be obtained by assuming that w is slowly changing. Therefore, every 2 adjacent pilots can be merged together and the problem for these two pilots can be optimized separately, assuming a constant w. Then, the overall structure of the pilots can be inferred. Combining every two adjacent pilots together, averaging them as if there is no weighting w (or a constant weight) leads back to the original formula for the frequency-smoothed unbiased training signal:

$$p_1 p_{1m} + p_2 p_{2m} = 0$$

where $p_1$ and $p_2$ are adjacent in frequency, rather than falling in consecutive symbol periods. One simple FSTS involves rotating the pilots by 90 degrees, from one pilot to the next one in frequency, moving in a mirror fashion from the center frequency to the edge frequency. Alternately, the sign of the negative (mirror) frequency pilots can be flipped while maintaining same sign for the positive (reference) frequency pilots (or vice versa). Other combinations that achieve good scrambling are possible.

Simulations for WiMedia UWB using all positive (reference) frequency pilots set equal to 1, with the sign of every other negative (mirror) frequency pilot inverted (e.g., +1, −1, +1, −1, etc), show excellent results, comparable to a time unbiased training sequence. The smoothing in frequency is performed via a w=sinc function with relatively slow variations from pilot to pilot. This weight function is mandated by other requirements (such as channel estimation improvement even in the absence of IQ imbalance).

Estimation

The use of unbiased training sequences and the above-mentioned conventional channel estimation results is a Least Squares (LS) estimator. Of all the LS estimators, the Minimum Mean Squared Error (MMSE) sense shows significant value.

Least Squares Estimator

L transmissions $X_i$, L noise terms $N_i$ and L observations $Y_i$, may be respectively concatenated into the 2 by L matrices $$x = (X_1 X_2 \ldots X_L)$$

$$N = (N_1 N_2 \ldots N_L)$$

$$y = (Y_1 Y_2 \ldots Y_L). \quad (16)$$

Then, equation (12) becomes $$y = H'x + N. \quad (17)$$

The unknown is H'. The LS estimator is $$\hat{H}' = y x^H (xx^H)^{-1}. \quad (18)$$

When condition (14) is satisfied, it is easy to verify that $xx^H$ is diagonal (the cross terms vanish). It is proportional to an identity matrix since the pilots are normalized to unit norm. Then $$\hat{H}' = y x^H / L = 1/L \Sigma_i Y_i X_i^H \quad (19)$$

is precisely four conventional channel estimations with de-rotations respectively by $p_i^*$, $p_{im}$, $p_{im}^*$ and $p_i$ as described in the previous section. Two estimations are obtained for frequency f, and two estimations for mirror frequency −f.

Optimal Estimator

Unbiased training sequences and conventional channel estimations are an LS estimator. But any estimator $\hat{H}' = y x^H (xx^H)^{-1}$ is also an LS estimator. Below, it is shown that the use of unbiased training sequences results in an excellent estimator. Model (17) can be viewed as unknown information H' sent via 2 consecutive transmissions over 2 vectors (rows of x) in an L dimension space. We denote by $x_j$, $N_j$ and $y_j$ respectively row j of x, N and y, where $j \in \{1,2\}$. Models (12) and (17) can be written $$y_1 = h'x_1 + \beta'_m x_2 + N_1$$

$$y_2 = \beta' x_1 + h'_m x_2 + N_2. \quad (20)$$

There are 2 transmissions, each involving the 2 vectors $x_1$, $x_2$, and where each vector is carrying complex amplitude information to be estimated. The LS estimator consists of projecting onto each vector, in a parallel way to the other vector in order to cancel interference. A very good result is obtained when the 2 vectors are orthogonal, i.e., when dot product (14) is zero. Unbiased training sequences are by definition, training sequences that verify this condition. Other sequences use non-orthogonal vectors and suffer a loss of performance function of the angle between the vectors $x_1$ and $x_2$. Many OFDM systems currently use a very poor kind of training sequences where $x_1, x_2$ are collinear, and it is impossible to properly estimate the 4 entries in H'. These training sequences tend to estimate noisier versions of the channels h' and h'$_m$.

To calculate the Mean Squared Errors (MSE), the estimation error is $\hat{H}' - H' = N x^H (xx^H)^{-1}$. This is a 2 by 2 matrix, i.e., 4 error values. Each value can be isolated by multiplying left and right with combinations of the vectors $(1\ 0)^T$ and $(0\ 1)^T$. Assuming EN $N^H$ is an identity matrix, or more generally a diagonal matrix with elements $\sigma^2$ and $\sigma_m^2$, it can be shown that the MSE of $\hat{h}'$ and $\beta_m'$ are, respectively, the first and second diagonal elements of $\sigma^2 (xx^H)^{-1}$. And for $\hat{\beta}'$ and $\hat{h}_m'$, the MSE are, respectively, the first and second diagonal element of $\sigma_m^2 (xx^H)^{-1}$.

The total MSE is $2(\sigma^2 + \sigma_m^2) \text{tr}(xx^H)^{-1}$. Now the problem is to find x that minimizes $\text{tr}(xx^H)^{-1}$ subject to the constraint that total pilot power is constant, i.e., $\text{tr}(xx^H) = 2L$. Using an Eigen decomposition, the problem can be written as minimize $\Sigma\ 1/\lambda_j$ subject to $\Sigma\ \lambda_j$ is constant. The problem is solved with the Lagrange multipliers, and is typically optimum when all Eigen values are equal. This means $xx^H = LI$ is proportional to an identity matrix.

The total MSE has been minimized, and the resulting MSE per element is either $\sigma^2/L$ or $\sigma_m^2/L$. But this MSE per element is likely to be the best that can be obtained, even if a unique vector transmission is used. The MSE is unlikely to be improved for a 2 vector transmissions, and therefore the MSE per element has been minimized. The unbiased training sequences plus conventional channel estimator are the MMSE of all LS estimators.

IQ Imbalance Compensation

If the gain from the unbiased channel estimate is not enough, the IQ imbalance parameters may be estimated (as described previously) and applied to compensate for data distortion. H' is estimated in model (12), Y=H'X+N. Now the focus turns to the unknown data X. The model is the same as any 2-tap channel with cross-correlations. Any channel equalization algorithm can be fitted. A simple equalization algorithm is presented suitable for the ubiquitous bit-interleaved coded QAM and fading channels.

One concern with the Zero-Forcing (ZF) approach $H'^{-1}Y = X + H'^{-1}N$ is that it enhances noise when the mirror channel is weak, unless an accounting is made for the complicated colored noise. The present solution uses ZF, but only when the mirror channel is not weak. In equation (12), replacing $x_m$ by its value, the following is obtained $$y = (h' - \beta'_m \beta'^* / h'^*_m)x + (\beta'_m / h'^*_m)y^*_m - (\beta'_m / h'^*_m)n^*_m + n \quad (21)$$

$$\approx h'x + (\beta'_m / h'^*_m)y^*_m + n' + n,$$

where $$n' \triangleq -(\beta'_m/h'^*_m)n^*_m$$

is noise enhancement. Note: it is assumed the second order imbalance term $\beta'^*\beta_m'<<h'h_m'^*$. When this approximation is invalid, the corrected channel $h'_c \triangleq h'-\beta_m'\beta'^*/h_m'^*$ is considered, which entails precise estimation of the channel and imbalance parameters.

Basically, the ZF technique consists of computing $$z = y - (\beta_m'/h_m'^*)y_m^* \approx h'x + n' + n. \quad (22)$$

By subtracting the mirror frequency quantity $(\beta_m'/h_m')y_m$ from the received signal y, the simple channel model with no IQ imbalance is obtained. The rest of the decoding chain is unchanged.

This solution works well as long as the noise enhancement is weaker than the original interference from IQ imbalance, i.e., $|n'|^2 < |\beta_m'x_m^*|^2$. If not, then the original y is used rather than the imbalance corrected z. It is unnecessary to estimate n' in order to make a decision. A robust average-wise improvement may be elected. So, considering the expected values $$E|n'|^2 = (|\beta_m'|^2/|h_m'|^2)E|n_m|^2 < |\beta_m'|^2 E|x_m^*|^2 \quad (23)$$

$$\to |h_m'|^2 \frac{E|x_m^*|^2}{E|n_m|^2} \triangleq SNR_m > 1.$$

When the mirror frequency's signal to noise ratio $SNR_m$ is greater than 1, the imbalance corrected term z is used. Otherwise, the original signal y is kept. Due to channel and imbalance estimation imprecision, it is safer to use a larger SNR, for example, $SNR_m > 2$ works well for WiMedia UWB. Note that $SNR_m$ can usually be obtained from the global SNR via the formula $SNR_m = |h_m'|^2 SNR$.

Table 3 summarizes the ZF algorithm with noise enhancement avoidance.

TABLE 3

| Compensation algorithm | |
|---|---|
| $SNR_m < 1 + \delta$ | $SNR_m > 1 + \delta$ |
| z = y | $z = y - (\beta_m'/h_m')y_m$ |

Simulation Results

Figure 10:
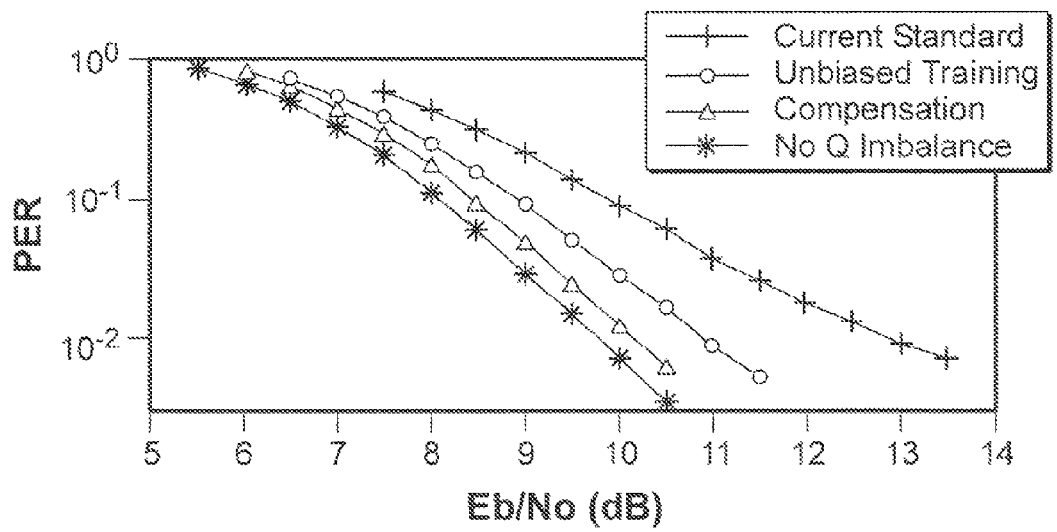
FIG. 10 depicts the performance achieved by applying unbiased training signal algorithms to the WiMedia UWB standard.

FIG. 10 depicts the performance achieved by applying unbiased training signal algorithms to the WiMedia UWB standard. The highest data rate, 480 Mbps, is simulated in IEEE 802.15.3's channel model CM2 (indoor pico-environment of about 4 meters). Shadowing and band hopping are turned off. The IQ imbalance is constant and equal to $2\epsilon=10\%$ (0.8 dB) in amplitude and $2\Delta\phi=10$ degrees in phase. The same amount of imbalance is present at the transmitter and receiver. The figure shows the Packet Error Rate (PER) as a function of Eb/No. The performance degrades quickly without any form of compensation. Table 4 lists the loss of various algorithms with respect to ideal case.

TABLE 4

| WiMedia UWB: loss from IQ imbalance at PER of $10^{-2}$ | | |
|---|---|---|
| Current Standard | Unbiased Training | Compensation |
| 3.1 dB | 1.1 dB | 0.35 dB |

End-to-end IQ imbalance and channel combine to form a global 2 by 2 channel matrix. The use of unbiased training sequences achieves considerable gains at no cost. The unbiased training sequences automatically cancel end-to-end self-generated interference from the channel estimate. Moreover, such training sequences are ideal for estimating IQ imbalance parameters, and a simple algorithm is given to compensate for data distortion: Zero-Forcing with noise enhancement avoidance.

WiMedia UWB, in particular, benefits from the following enhancement: the conventional biased training sequence that consists of 6 symbols exclusively transmitted on the I channel can be divided in 2 halves to create an unbiased sequence. The first 3 symbols are sent on the I channel, and the last 3 symbols are sent on the Q channel. By uniformly spanning the complex plane, an unbiased training sequence is created with large gains for high data rates. For backward compatibility, this scheme may be reserved for high data rate modes and signaled via the beacons, or the training sequence type may be blindly detected.

In OFDMA (e.g., WiMAX), the subcarriers f and −f can be assigned to different users. Considerable interference can arise if power control drives one user to high power level. It is therefore a good idea to locate the pilots of different users on mirror subcarriers. The pilots should satisfy the unbiased training sequence criterion. Each user automatically benefits without any extra effort. The pilots may hop to different locations while maintaining mirror positions.

The time domain formulas can be extended to Code Division Multiple Access (CDMA) with a Rake equalizer combining several one-tap channels. Unbiased training sequences automatically improve the channel estimate per tap. A simple unbiased training sequence for CDMA consists of constantly rotating the complex symbols by 90 degrees.

The theory can be extended to other time domain systems (e.g., TDMA) besides CDMA. The channel estimate is obtained by the convolution of the received signal with a matched filter, which is mirror version of the complex conjugate of the FSTS. In other words, ignoring the AWGN, it is a convolution of the channel, the transmitted FSTS, and the matched filter. It can be shown that the channel estimate contains a self-interference (bias) term generated by the IQ imbalance. By considering the equation in frequency domain, the self-interference term can be made to nearly vanish if the FSTS is carefully chosen. Indeed, by using the above-described FSTSs, the self-interference tends to cancel after summing up the values from adjacent tones (assuming slow channel variations). Hence, an unbiased training signal for time domain systems can be designed with frequency domain constraints on adjacent tones.

In fact, GSM training sequences have been studied and it is observed that certain training sequences and certain MSK modulation rotations behave better than others. No simple insight is given as to why there is a difference in performance. As mentioned above for time domain systems, the difference in performance is may be due to a good (unbiased) versus bad spanning of the complex plane in the time domain by every group of adjacent frequencies and their mirror frequencies.

Figure 11:
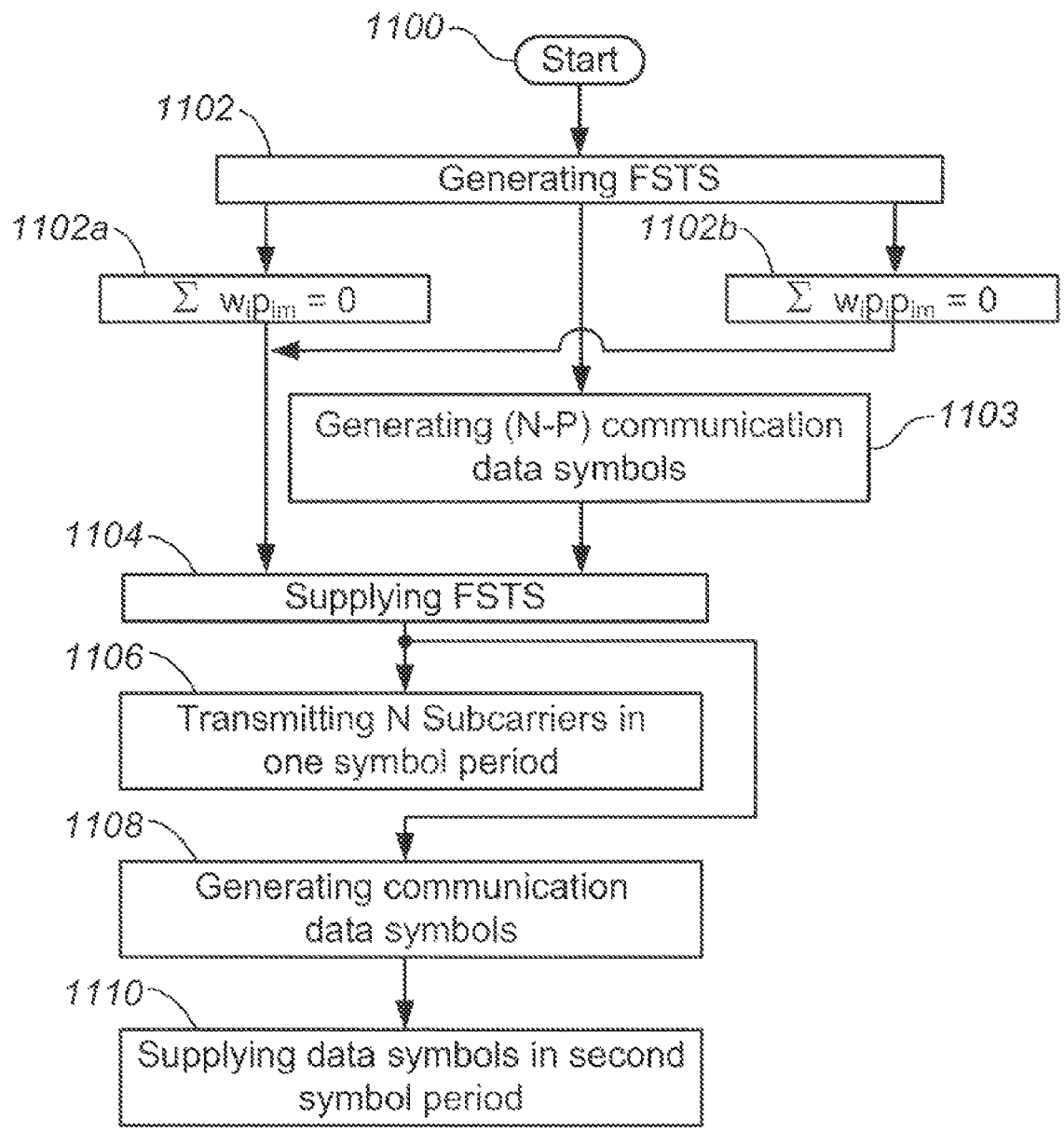
FIG. 11 is a flowchart illustrating a method for supplying a frequency-smoothed communications training signal.

FIG. 11 is a flowchart illustrating a method for supplying a frequency-smoothed communications training signal. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. As used herein, the terms "generating", "deriving", and "multiplying" refer to processes that may be enabled through the use of machine-readable software instructions, hardware, or a combination of software and hardware. The method starts at Step 1100.

Step 1102 generates a frequency-smoothed unbiased training signal in a quadrature modulation transmitter. The frequency-smoothed unbiased training signal includes a plurality of pilot signal products, where each pilot signal product includes complex plane information represented by a reference frequency subcarrier, multiplying complex plane information represented by mirror frequency subcarrier. The sum of the plurality of pilot signal products is equal to zero. Step 1104 supplies the frequency-smoothed unbiased training signal within a single symbol period. In one aspect, the components of the FSTS may be supplies serially or in batches, and stored until a complete FSTS is collected. In this aspect, a subsequent step (not shown) would transmit the collected FSTS is a single symbol period.

In one aspect, generating a frequency-smoothed unbiased training signal in Step 1102 including a generating plurality of adjacent reference frequency subcarriers and a plurality of adjacent mirror frequency subcarriers. The FSTS may be comprised of 2 or more pilot signal products. In another aspect, Step 1102 generates the frequency-smoothed unbiased training signal that includes with a group of adjacent reference frequency subcarriers, without intervening subcarriers, and a plurality of adjacent mirror frequency subcarriers, without intervening subcarriers.

In one aspect, the frequency-smoothed unbiased training signal may be represented as follows, as depicted in Step 1102a:

$$\Sigma\, p_i\, p_{im} = 0,\ \text{from}\ i=1\ \text{to}\ n;$$

where p is a reference frequency subcarrier
where $p_m$ is a mirror frequency subcarrier, and
where n is equal to the number of pilot signal products.

In another aspect, the frequency-smoothed unbiased training signal may be represented as follows, as depicted in Step 1102b:

$$\Sigma\, w_i\, p_i\, p_{im} = 0,\ \text{from}\ i=1\ \text{to}\ n;$$

where w is a weighting factor.

As an example, the frequency-smoothed unbiased training signal may be comprised of a first pilot signal product with a reference subcarrier at frequency +f representing information as a first complex plane value, and a mirror subcarrier at frequency −f representing the first complex plane value. The FSTS further includes a second pilot signal product with a reference subcarrier at frequency (f+1), adjacent frequency +f, representing the first complex plane value, and a mirror subcarrier at frequency −(f+1), adjacent the frequency −f, representing the first complex plane value +180 degrees.

As another example, the frequency-smoothed unbiased training signal may be generated as a first pilot signal product with a reference subcarrier at frequency +f representing information as a first complex plane value, and a mirror subcarrier at frequency −f representing the first complex plane value. Then, the FSTS also includes a second pilot signal product with a reference subcarrier at frequency (f+1), adjacent frequency +f, representing the first complex plane value +90 degrees, and a mirror subcarrier at frequency −(f+1), adjacent frequency −f, representing the first complex plane value −90 degrees.

In a different aspect, generating the unbiased frequency-smoothed training signal in Step 1102 includes generating P pilot signal products. In this aspect Step 1103 generates (N−P) communication data symbols. Typically, Step 1104 supplies the FSTS and communication data symbols is a single symbol period. Step 1106 transmits N subcarriers in one symbol period, including the frequency-smoothed unbiased training signal and quadrature modulated communication data.

Alternately, Step 1102 generates a frequency-smoothed unbiased training signal using a group of reference frequency subcarriers and corresponding mirror frequency subcarriers, and Step 1104 supplies the frequency-smoothed training signal in a first symbol period. Step 1108 generates quadrature modulated communication data on the group of reference frequency subcarriers and corresponding mirror frequency subcarriers. Step 1110 supplies the quadrature modulated communication data in a second symbol period, subsequent to the first symbol period.

The above-described flowchart may also be interpreted as an expression of a machine-readable medium having stored thereon instructions for a frequency-smoothed communications training signal. The instructions would correspond to Steps 1100 through 1110, as explained above.

Figure 12:
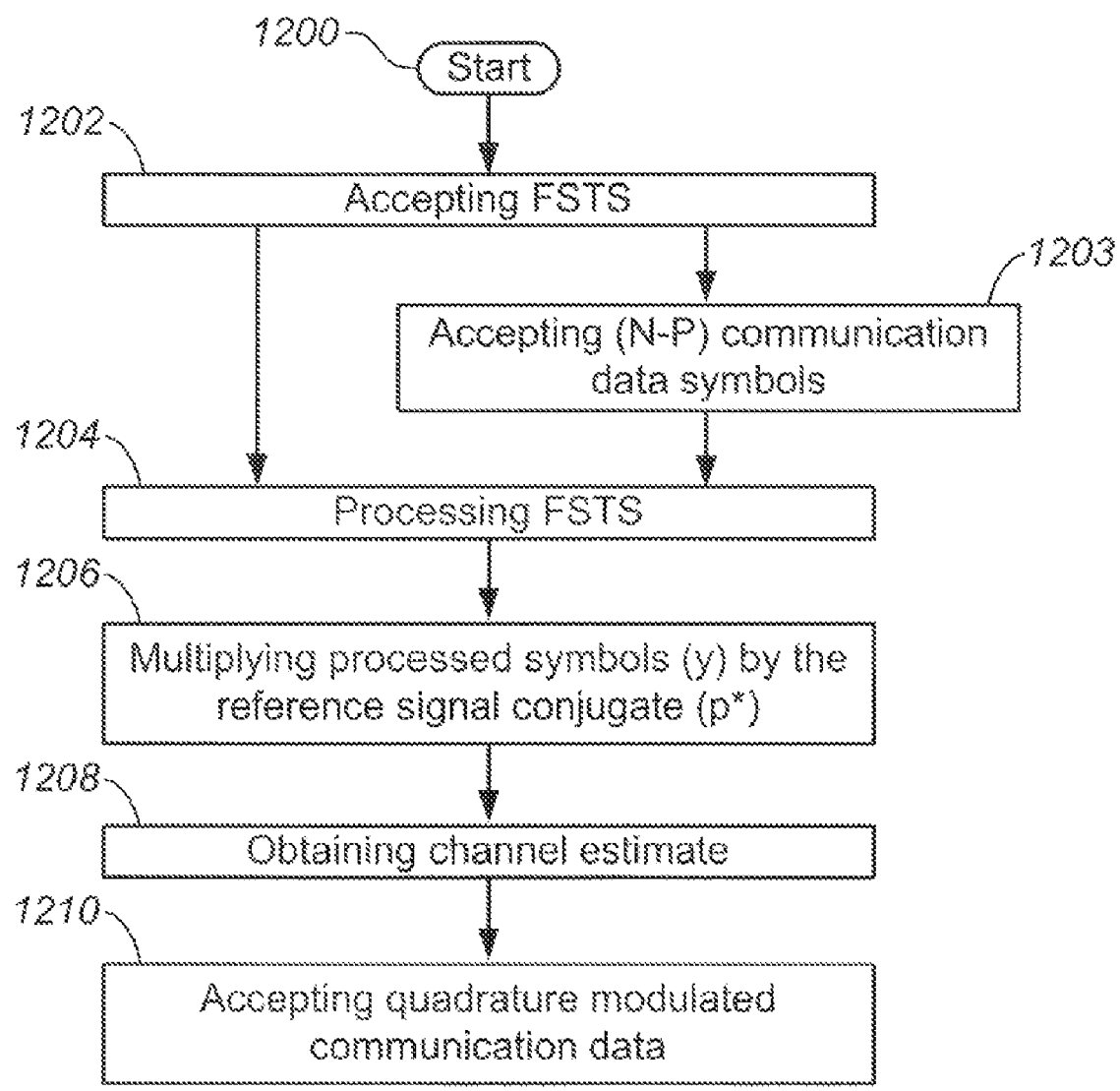
FIG. 12 is a flowchart illustrating a method for calculating a channel estimate using a frequency-smoothed unbiased training signal.

FIG. 12 is a flowchart illustrating a method for calculating a channel estimate using a frequency-smoothed unbiased training signal. The method starts at Step 1200. Step 1202 accepts a frequency-smoothed unbiased training sequence in a quadrature demodulation receiver. The frequency-smoothed unbiased training sequence includes a plurality of pilot signal products, where each pilot signal product includes predetermined complex plane information (p) represented by a reference frequency subcarrier (f), multiplying predetermined complex plane information ($p_m$) represented by mirror frequency subcarrier (−f). The sum of the plurality of pilot signal products is equal to zero. Step 1204 processes the frequency-smoothed unbiased training signal, generating a plurality of processed symbols (y) representing complex plane information. Step 1206 multiplies each processed symbol (y) by a conjugate of a corresponding reference signal (p*). Step 1208 obtains a frequency-smoothed channel estimate (h).

Note: the processed symbols (y) are associated with the reference subcarrier. Alternately, Step 1204 may processes the frequency-smoothed unbiased training signal, generating a plurality of processed symbols ($y_m$) representing complex plane information associated with the mirror subcarrier. Then, Step 1206 multiplies each processed symbol ($y_m$) by a conjugate of a corresponding reference signal ($p_m$*), and Step 1208 obtains a frequency-smoothed channel estimate ($h_m$) associated with the mirror subcarrier. As another alternative, the above-mentioned steps find both the (h) and ($h_m$) channel estimates.

In one aspect, Step 1202 accepts plurality of adjacent reference frequency subcarriers and a plurality of adjacent mirror frequency subcarriers. The FSTS may be comprised of 2 or more pilot signal products. In another aspect, Step 1202 accepts the frequency-smoothed unbiased training signal including a group of adjacent reference frequency subcarriers, without intervening subcarriers, and a plurality of adjacent mirror frequency subcarriers, without intervening subcarriers.

In one aspect, the frequency-smoothed unbiased training signal may be represented as follows:

$$\Sigma\, p_i\, p_{im} = 0, \text{ from } i=1 \text{ to } n;$$

where p is a reference frequency subcarrier
where $p_m$ is a mirror frequency subcarrier, and
where n is equal to the number of pilot signal products.

In another aspect, the frequency-smoothed unbiased training signal may be represented as follows:

$$\Sigma\, w_i\, p_i\, p_{im} = 0, \text{ from } i=1 \text{ to } n;$$

where w is a weighting factor.

As in the transmitter FSTS examples, the frequency-smoothed unbiased training signal may be comprised of a first pilot signal product with a reference subcarrier at frequency +f representing information as a first complex plane value, and a mirror subcarrier at frequency −f representing the first complex plane value. The FSTS further includes a second pilot signal product with a reference subcarrier at frequency (f+1), adjacent frequency +f, representing the first complex plane value, and a mirror subcarrier at frequency −(f+1), adjacent the frequency −f, representing the first complex plane value +180 degrees.

As another example, the frequency-smoothed unbiased training signal may be generated as a first pilot signal product with a reference subcarrier at frequency +f representing information as a first complex plane value, and a mirror subcarrier at frequency −f representing the first complex plane value. Then, the FSTS also includes a second pilot signal product with a reference subcarrier at frequency (f+1), adjacent frequency +f, representing the first complex plane value +90 degrees, and a mirror subcarrier at frequency −(f+1), adjacent frequency −f, representing the first complex plane value −90 degrees.

In one variation, Step 1202 accepts the unbiased frequency-smoothed training signal as P pilot signal products in a symbol period. Then, Step 1203 accepts (N−P) communication data symbols in the (same) symbol period.

Alternately, Step 1202 accepts a frequency-smoothed unbiased training signal with a group of reference frequency subcarriers and corresponding mirror frequency subcarriers. Then, Step 1210 accepts quadrature modulated communication data on the group of reference frequency subcarriers and corresponding mirror frequency subcarriers, subsequent to the receipt of the frequency-smoothed unbiased training signal.

The above-described flowchart may also be interpreted as an expression of a machine-readable medium having stored thereon instructions for calculating a channel estimate using a FSTS. The instructions would correspond to Steps 1200 through 1210, as explained above.

Systems, methods, devices, and processors have been presented to enable the transmission of a FSTS and the use of a FSTS in the calculation of receiver channel estimates. Examples of particular communications protocols and formats have been given to illustrate the invention. However, the invention is not limited to merely these examples. Other variations and embodiments of the invention will occur to those skilled in the art.

What is claimed is:

1. A method of transmitting a training signal, the method comprising:
    generating a training signal in a quadrature modulation transmitter, the training signal representing a plurality of reference complex values to be respectively transmitted on a plurality of reference frequency subcarriers during a single symbol period and a plurality of corresponding mirror complex values to be respectively transmitted on a plurality of corresponding mirror frequency subcarriers during the single symbol period, wherein the sum of the products of the reference complex values and the corresponding mirror complex values is equal to zero; and
    transmitting the training signal within the single symbol period.

2. The method of claim 1 wherein generating the training signal comprises generating a training signal representing a plurality of reference complex values to be respectively transmitted on a plurality of adjacent reference frequency subcarriers and a plurality of corresponding mirror complex values to be respectively transmitted on a plurality of adjacent corresponding mirror frequency subcarriers.

3. The method of claim 1 wherein generating the training signal comprises generating a training signal representing a plurality of reference complex values to be respectively transmitted on a plurality of adjacent reference frequency subcarriers, without intervening subcarriers, and a plurality of corresponding mirror complex values to be respectively transmitted on a plurality of adjacent corresponding mirror frequency subcarriers, without intervening subcarriers.

4. The method of claim 1 wherein generating the training signal comprises generating a training signal such that $$\Sigma\, p_i\, p_{im} = 0, \text{ from } i=1 \text{ to } n;$$

where p is a reference complex value to be transmitted on a reference frequency subcarrier,
where $p_m$ is a mirror complex value to be transmitted on a corresponding mirror frequency subcarrier, and
where n is equal to the number of reference frequency subcarriers.

5. The method of claim 1 wherein generating the training signal comprises generating a training signal such that $$\Sigma\, w_i\, p_i\, p_{im} = 0, \text{ from } i=1 \text{ to } n;$$

where p is a reference complex value to be transmitted on a reference frequency subcarrier,
where $p_m$ is a mirror complex value to be transmitted on a corresponding mirror frequency subcarrier,
where n is equal to the number of reference frequency subcarriers, and
where w is a weighting factor.

6. The method of claim 1 wherein generating the training signal comprises generating a training signal representing at least a first reference complex value to be transmitted on a first reference subcarrier at frequency +f1 and a first corresponding mirror complex value to be transmitted on a first corresponding mirror subcarrier at frequency −f1 and a second reference complex value to be transmitted on a second reference subcarrier at frequency +f2 and a second corresponding mirror complex value to be transmitted on a second corresponding mirror subcarrier at frequency −f2.

7. The method of claim 1 wherein generating the training signal comprises generating a training signal representing at least a first reference complex value to be transmitted on a first reference subcarrier at frequency +f and a first corresponding mirror complex value to be transmitted on a first corresponding mirror subcarrier at frequency −f and a second reference complex value to be transmitted on a second reference subcarrier at frequency (f+1), adjacent to frequency +f and a second corresponding mirror complex value to be transmitted on a second corresponding mirror subcarrier at frequency −(f+1), adjacent to frequency −f.

8. The method of claim 1 further comprising:
generating a plurality of communication data symbols; and
transmitting the training signal and the communication data symbols in the single symbol period on N subcarriers, wherein N is the number of communication data symbols added to the number of reference subcarriers.

9. The method of claim 1 further comprising:
generating quadrature modulated communication data to be transmitted on the reference frequency subcarriers and corresponding mirror frequency subcarriers; and
transmitting the quadrature modulated communication data in a second symbol period, subsequent to the single symbol period.

10. A method for calculating a channel estimate, the method comprising:
receiving a training signal at a quadrature demodulation receiver, the training signal representing a plurality of reference complex values respectively received on a plurality of reference frequency subcarriers during a single symbol period and a plurality of corresponding mirror complex values respectively received on a plurality of corresponding mirror frequency subcarriers during the single symbol period, wherein the sum of the products of the reference complex values and the corresponding mirror complex values is equal to zero;
generating a plurality of processed symbols (y) representing complex plane information based on the training signal;
multiplying each processed symbol (y) by a conjugate of a corresponding reference complex value (p*); and
obtaining a channel estimate (h) based on multiplication products.

11. The method of claim 10 wherein receiving the training signal comprises receiving a training signal representing a plurality of reference complex values respectively received on a plurality of adjacent reference frequency subcarriers and a plurality of corresponding mirror complex values respectively received on a plurality of adjacent mirror frequency subcarriers.

12. The method of claim 10 wherein receiving the training signal comprises receiving a training signal representing a plurality of reference complex values respectively received on a plurality of adjacent reference frequency subcarriers, without intervening subcarriers, and a plurality of corresponding mirror complex values respectively received on a plurality of adjacent corresponding mirror frequency subcarriers, without intervening subcarriers.

13. The method of claim 10 wherein receiving the training signal comprises receiving a training signal such that $\Sigma\, p_i\, p_{im} = 0$, from i=1 to n;

where p is a reference complex value received on a reference frequency subcarrier,
where $p_m$ is the mirror complex value received on a corresponding mirror frequency subcarrier, and
where n is equal to the number of reference frequency subcarriers.

14. The method of claim 10 wherein receiving the training signal comprises receiving a training signal such that $\Sigma\, w_i\, p_i\, p_{im} = 0$, from i=1 to n;

where p is a reference complex value received on a reference frequency subcarrier,
where $p_m$ is a mirror complex value received on a corresponding mirror frequency subcarrier,
where n is equal to the number of reference frequency subcarriers, and
where w is a weighting factor.

15. The method of claim 10 wherein receiving the training signal comprises receiving a training signal representing at least a first reference complex value received on a reference subcarrier at frequency +f1 and a first corresponding mirror complex value received on a first corresponding mirror subcarrier at frequency −f and a second reference complex value received on a second reference subcarrier at frequency +f2 and a second corresponding mirror complex value received on a second corresponding mirror subcarrier at frequency −f2.

16. The method of claim 10 wherein receiving the training signal comprises receiving a training signal representing at least a first reference complex value received on a first reference subcarrier at frequency +f and a first corresponding mirror complex value received on a first corresponding mirror subcarrier at frequency −f and a second reference complex value received on a second reference subcarrier at frequency (f+1), adjacent to frequency f+ and a second corresponding mirror complex value received on a second corresponding mirror subcarrier at frequency −(f+1), adjacent to frequency −f.

17. The method of claim 10 further comprising:
receiving a plurality of communication data symbols in the single symbol period.

18. The method of claim 10 further comprising:
receiving quadrature modulated communication data on the reference frequency subcarriers and corresponding mirror frequency subcarriers, subsequent to receiving the training signal.

19. A system for transmitting a training signal, the system comprising:
a signal generator configured to generate a training signal representing a plurality of reference complex values to be respectively transmitted on a plurality of reference frequency subcarriers during a single symbol period and a plurality of corresponding mirror complex values to be respectively transmitted on a plurality of corresponding mirror frequency subcarriers during the single symbol period, wherein the sum of the products of the reference complex values and the corresponding mirror complex values is equal to zero; and
a transmitter configured to transmit the training signal within the single symbol period.

20. The system of claim 19 wherein the signal generator generates a training signal representing a plurality of reference complex values to be respectively transmitted on a plurality of adjacent reference frequency subcarriers and a plurality of corresponding mirror complex values to be respectively transmitted on a plurality of adjacent mirror frequency sub carriers.

21. The system of claim 19 wherein the signal generator generates a training signal representing a plurality of reference complex values to be respectively transmitted on a plurality of adjacent reference frequency subcarriers, without intervening subcarriers, and a plurality of corresponding mirror complex values to be respectively transmitted on a plurality of adjacent mirror frequency subcarriers, without intervening subcarriers.

22. The system of claim 19 wherein the signal generator generates a training signal such that $\Sigma\, P_i\, p_{im} = 0$, from i=1 to n;

where p is a reference complex value to be transmitted on a reference frequency subcarrier,
where $p_m$ is a mirror complex value to transmitted on a corresponding mirror frequency subcarrier, and where n is equal to the number of reference frequency subcarriers.

23. The system of claim 19 wherein the signal generator generates a training signal such that $\Sigma w_i\, p_i\, p_{im} = 0$, from i=1 to n;

where p is a reference complex value to be transmitted on a reference frequency subcarrier, where $p_m$ is a mirror complex value to be transmitted on a corresponding mirror frequency subcarrier, where n is equal to the number of reference frequency subcarriers, and where w is a weighting factor.

24. The system of claim 19 wherein the signal generator generates a training signal representing at least a first reference complex value to be transmitted on a first reference subcarrier at frequency +f1 and a first corresponding mirror complex value to be transmitted on a first corresponding mirror subcarrier at frequency −f1 and a second reference complex value to be transmitted on a second reference subcarrier at frequency +f2 and a second corresponding mirror complex value to be transmitted on a second corresponding mirror subcarrier at frequency −f2.

25. The system of claim 19 wherein the signal generator generates a training signal representing at least a first reference complex value to be transmitted on a first reference subcarrier at frequency +f and a first corresponding mirror complex value to be transmitted on a first corresponding mirror subcarrier at frequency −f and a second reference complex value to be transmitted on a second reference subcarrier at frequency (f+1), adjacent to frequency +f and a second corresponding mirror complex value to be transmitted on a second corresponding mirror subcarrier at frequency −(f+1), adjacent to frequency −f.

26. The system of claim 19 wherein the transmitter transmits the training signal and a plurality of communication symbols in the single symbol period on N subcarriers, wherein N is the number of communication data symbols added to the number of reference subcarriers.

27. The system of claim 19 wherein the transmitter transmits a plurality of communication data symbols on the reference frequency subcarriers and corresponding mirror frequency subcarriers in a second symbol period, subsequent to the single symbol period.

28. A system for calculating a channel estimate using a frequency-smoothed unbiased training signal, the system comprising:

a receiver configured to receive a training signal representing a plurality of reference complex values respectively received on a plurality of reference frequency subcarriers during a single symbol period and a plurality of corresponding mirror complex values respectively received on a plurality of corresponding mirror frequency subcarriers during the single symbol period, wherein the sum of the products of the reference complex values and the corresponding mirror complex values is equal to zero; and a processor configured to generate a plurality of processed symbols (y) representing complex plane information based on the training signal, multiply each processed symbol (y) by a conjugate of a corresponding reference signal (p*), and determine a channel estimate (h) based on the multiplication products.

29. The system of claim 28 wherein the receiver is configured to receive a training signal representing a plurality of reference complex values respectively received on a plurality of adjacent reference frequency subcarriers and a plurality of corresponding mirror complex values respectively received on a plurality of adjacent mirror frequency subcarriers.

30. The system of claim 28 wherein the receiver is configured to receive a training signal representing a plurality of reference complex values respectively received on a plurality of adjacent reference frequency subcarriers, without intervening subcarriers, and a plurality of corresponding mirror complex values respectively received on a plurality of adjacent corresponding mirror frequency subcarriers, without intervening subcarriers.

31. The system of claim 28 wherein the receiver is configured to receive a training signal such that $\Sigma p_i\, p_{im} = 0$, from i=1 to n;

where p is a reference complex value received on a reference frequency subcarrier, where $p_m$ is a mirror complex value received on a corresponding mirror frequency subcarrier, and where n is equal to the number of reference frequency subcarriers.

32. The system of claim 28 wherein the receiver is configured to receive a training signal such that $\Sigma w_i\, p_i\, p_{im} = 0$, from i=1 to n;

where p is a reference complex value received on a reference frequency subcarrier, where $p_m$ complex value received on a corresponding mirror frequency subcarrier, where n is equal to the number of reference frequency subcarriers, and where w is a weighting factor.

33. The system of claim 28 wherein the receiver is configured to receive a training signal representing at least a first reference complex value received on a reference subcarrier at frequency +f1 and a first corresponding mirror complex value received on a first corresponding mirror subcarrier at frequency −f and a second reference complex value received on a second reference subcarrier at frequency +f2 and a second corresponding mirror complex value received on a second corresponding mirror subcarrier at frequency −f2.

34. The system of claim 28 wherein the receiver is configured to receive a training signal representing at least a first reference complex value received on a first reference subcarrier at frequency +f and a first corresponding mirror complex value received on a first corresponding mirror subcarrier at frequency −f and a second reference complex value received on a second reference subcarrier at frequency (f+1), adjacent to frequency +f and a second corresponding mirror complex value received on a second corresponding mirror subcarrier at frequency −(f+1), adjacent to frequency −f.

35. The system of claim 28 wherein the receiver is configured to receive a plurality of communication data symbols in the single symbol period.

36. The system of claim 28 wherein the receiver is configured to receive quadrature modulated communication data on the reference frequency subcarriers and corresponding mirror frequency subcarriers in a second symbol period, subsequent to the single symbol period.

37. A non-transitory machine-readable medium having stored thereon instructions for transmitting a training signal, the instructions comprising:

generating a training signal in a quadrature modulation transmitter, the training signal representing a plurality of reference complex values to be respectively transmitted on a plurality of reference frequency subcarriers during a single symbol period and a plurality of corresponding mirror complex values to be respectively transmitted on a plurality of corresponding mirror frequency subcarriers during the single symbol period, wherein the sum of the products of the reference complex values and the corresponding mirror complex values is equal to zero; and transmitting the training signal within the single symbol period.

38. A non-transitory machine-readable medium having stored thereon instructions for calculating a channel estimate, the instructions comprising:

receiving a training signal at a quadrature demodulation receiver, the training signal representing a plurality of reference complex values respectively received on a plurality of reference frequency subcarriers during a single symbol period and a plurality of corresponding mirror complex values respectively received on a plurality of corresponding mirror frequency subcarriers during the single symbol period, wherein the sum of the products of the reference complex values and the corresponding mirror complex values is equal to zero;

generating a plurality of processed symbols (y) representing complex plane information based on the training signal;

multiplying each processed symbol (y) by a conjugate of a corresponding reference complex value (p*); and obtaining a channel estimate (h) based on multiplication products.

39. A device for transmitting a training signal, the device comprising:

signal generation means for generating a training signal representing a plurality of reference complex values to be respectively transmitted on a plurality of reference frequency subcarriers during a single symbol period and a plurality of corresponding mirror complex values to be respectively transmitted on a plurality of corresponding mirror frequency subcarriers during the single symbol period, wherein the sum of the products of the reference complex values and the corresponding mirror complex values is equal to zero; and transmitting means for transmitting the training signal within the single symbol period.

40. The device of claim 39 wherein the signal generation means comprises means for generating a training signal representing a plurality of reference complex values to be respectively transmitted on a plurality of adjacent reference frequency subcarriers and a plurality of corresponding mirror complex values to be respectively transmitted on a plurality of adjacent mirror frequency subcarriers.

41. The device of claim 39 wherein the signal generation means comprises means for generating a training signal representing a plurality of reference complex values to be respectively transmitted on a plurality of adjacent reference frequency subcarriers, without intervening subcarriers, and a plurality of corresponding mirror complex values to be respectively transmitted on a plurality of adjacent mirror frequency subcarriers, without intervening subcarriers.

42. The device of claim 39 wherein the signal generation means comprises means for generating a training signal such that $\Sigma\, p_i\, p_{im} = 0$, from i=1 to n;

where p is a reference complex value to be transmitted on a reference frequency subcarrier, where $p_m$ is a mirror complex value to be transmitted on a corresponding mirror frequency subcarrier, and where n is equal to the number of reference frequency subcarriers.

43. The device of claim 39 wherein the signal generation means comprises means for generating a training signal such that $\Sigma\, w_i\, p_i\, p_{im} = 0$, from i=1 to n;

where p is a reference complex value to be transmitted on a reference frequency subcarrier, where $p_m$ is a mirror complex value to be transmitted on a corresponding mirror frequency subcarrier, where n is equal to the number of reference frequency subcarriers, and where w is a weighting factor.

44. The device of claim 39 wherein the signal generation means comprises means for generating a training signal representing at least a first reference complex value to be transmitted on a first reference subcarrier at frequency +f1 and a first corresponding mirror complex value to be transmitted on a first corresponding mirror subcarrier at frequency −f1 and a second reference complex value to be transmitted on a second reference subcarrier at frequency +f2 and a second corresponding mirror complex value to be transmitted on a second corresponding mirror subcarrier at frequency −f2.

45. The device of claim 39 wherein the signal generation means comprises means for generating a training signal representing at least a first reference complex value to be transmitted on a first reference subcarrier at frequency +f and a first corresponding mirror complex value to be transmitted on a first corresponding mirror subcarrier at frequency −f and a second reference complex value to be transmitted on a second reference subcarrier at frequency (f+1), adjacent to frequency +f and a second corresponding mirror complex value to be transmitted on a second corresponding mirror subcarrier at frequency −(f+1), adjacent to frequency −f.

46. The device of claim 39 wherein transmitting means comprises means for transmitting the training signal and a plurality of communication symbols in the single symbol period on N subcarriers, wherein N is the number of communication data symbols added to the number of reference subcarriers.

47. The device of claim 39 wherein the transmitting means comprises means for transmitting a plurality of communication data symbols on the reference frequency subcarriers and corresponding mirror frequency subcarriers in a second symbol period, subsequent to the single symbol period.

48. A device for calculating a channel estimate, the device comprising:

receiving means for receiving a training signal representing a plurality of reference complex values respectively received on a plurality of reference frequency subcarriers during a single symbol period and a plurality of corresponding mirror complex values respectively received on a plurality of corresponding mirror frequency subcarriers during the single symbol period, wherein the sum of the products of the reference complex values and the corresponding mirror complex values is equal to zero; and processing means for generating a plurality of processed symbols (y) representing complex plane information based on the training signal, multiplying each processed symbol (y) by a conjugate of a corresponding reference signal (p*), and determining a channel estimate (h) based on the multiplication products.

49. The device of claim 48 wherein the receiving means comprises means for receiving a training signal representing a plurality of reference complex values respectively received on a plurality of adjacent reference frequency subcarriers and a plurality of corresponding mirror complex values respectively received on a plurality of adjacent mirror frequency subcarriers.

50. The device of claim 48 wherein the receiving means comprises means for receiving a training signal representing a plurality of reference complex values respectively received on a plurality of adjacent reference frequency subcarriers, without intervening subcarriers, and a plurality of corresponding mirror complex values respectively received on a plurality of adjacent corresponding mirror frequency subcarriers, without intervening subcarriers.

51. The device of claim 48 wherein the receiving means comprises means for receiving a training signal such that $\Sigma\, p_i\, p_{im} = 0$, from i=1 to n;

where p is a reference complex value received on a reference frequency subcarrier, where $p_m$ is a mirror complex value received on a corresponding mirror frequency subcarrier, and where n is equal to the number of reference frequency subcarriers.

52. The device of claim 48 wherein the receiving means comprises means for receiving a training signal such that $\Sigma\, w_i\, p_i\, p_{im} = 0$, from i=1 to n;

where p is a reference complex value received on a reference frequency subcarrier, where $p_m$ is a mirror complex value received on a corresponding mirror frequency subcarrier, where n is equal to the number of reference frequency subcarriers, and where w is a weighting factor.

53. The device of claim 48 wherein the receiving means comprises means for receiving a training signal representing at least a first reference complex value received on a reference subcarrier at frequency +f1 and a first corresponding mirror complex value received on a first corresponding mirror subcarrier at frequency −f1 and a second reference complex value received on a second reference subcarrier at frequency +f2 and a second corresponding mirror complex value received on a second corresponding mirror subcarrier at frequency −f2.

54. The device of claim 48 wherein the receiving means comprises means for receiving a training signal representing at least a first reference complex value received on a first reference subcarrier at frequency +f and a first corresponding mirror complex value received on a first corresponding mirror subcarrier at frequency −f and a second reference complex value received on a second reference subcarrier at frequency +(f+1), adjacent to frequency +f and a second corresponding mirror complex value received on a second corresponding mirror subcarrier at frequency −(f+1), adjacent to frequency −f.

55. The device of claim 48 wherein the receiving means comprises means for receiving a plurality of communication data symbols in the single symbol period.

56. The device of claim 48 wherein the receiving means comprises means for receiving quadrature modulated communication data on the reference frequency subcarriers and corresponding mirror frequency subcarriers in a second symbol period, subsequent to the single symbol period.

57. A processing device for generating a frequency-smoothed unbiased training signal, the processing device comprising:

a processor to generate a training signal representing a plurality of reference complex values to be respectively transmitted on a plurality of reference frequency subcarriers during a single symbol period and a plurality of corresponding mirror complex values to be respectively transmitted on a plurality of corresponding mirror frequency subcarriers during the single symbol period, wherein the sum of the products of the reference complex values and the corresponding mirror complex values is equal to zero.

58. A processing device for calculating a channel estimate, the processing device comprising:

a receiver to receive a training signal representing a plurality of reference complex values respectively received on a plurality of reference frequency subcarriers during a single symbol period and a plurality of corresponding mirror complex values respectively received on a plurality of corresponding mirror frequency subcarriers during the single symbol period, wherein the sum of the products of the reference complex values and the corresponding mirror complex values is equal to zero; and a processor configured to generate a plurality of processed symbols (y) representing complex plane information based on the training signal, multiply each processed symbol (y) by a conjugate of a corresponding reference signal (p*), and determine a channel estimate (h) based on the multiplication products.

* * * * *